(12) United States Patent
An et al.

(10) Patent No.: US 11,986,760 B2
(45) Date of Patent: May 21, 2024

(54) PORTABLE AIR PURIFIER

(71) Applicant: LG ELECTRONICS INC., Seoul (KR)

(72) Inventors: Seong Woo An, Seoul (KR); Dongeun Kim, Seoul (KR); Min Kyu Oh, Seoul (KR); Deukwon Lee, Seoul (KR); Daewoong Kim, Seoul (KR); Boan Kwon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 420 days.

(21) Appl. No.: 17/386,050

(22) Filed: Jul. 27, 2021

(65) Prior Publication Data
US 2022/0032224 A1 Feb. 3, 2022

(30) Foreign Application Priority Data

Jul. 28, 2020 (KR) .......................... 10-2020-0093970
Dec. 8, 2020 (KR) .......................... 10-2020-0170567

(51) Int. Cl.
 *B01D 46/00* (2022.01)
 *B01D 46/24* (2006.01)

(52) U.S. Cl.
 CPC ..... *B01D 46/0049* (2013.01); *B01D 46/0005* (2013.01); *B01D 46/24* (2013.01); *B01D 2273/30* (2013.01); *B01D 2279/65* (2013.01)

(58) Field of Classification Search
 CPC ............ B01D 46/0049; B01D 2273/30; B01D 46/0005; B01D 46/24; B01D 46/2403; B01D 46/2411; B01D 46/2414
 See application file for complete search history.

(56) References Cited

U.S. PATENT DOCUMENTS

| 2017/0246578 | A1* | 8/2017 | Jung ...................... B01D 46/24 |
| 2017/0246579 | A1* | 8/2017 | Mun ......................... A61L 9/22 |
| 2017/0248153 | A1* | 8/2017 | Park ...................... B01D 46/58 |
| 2017/0248339 | A1* | 8/2017 | Mun ................. B01D 46/0047 |
| 2019/0264948 | A1* | 8/2019 | Jung ......................... A61L 2/22 |
| 2020/0003440 | A1* | 1/2020 | Kim ...................... G06N 20/00 |

(Continued)

FOREIGN PATENT DOCUMENTS

| CN | 105299862 | 2/2016 |
| DE | 10 2015 115 964 | 3/2016 |

(Continued)

OTHER PUBLICATIONS

European Search Report issued in Application No. 21187902.8 dated Jan. 3, 2022.

*Primary Examiner* — Robert Clemente
(74) *Attorney, Agent, or Firm* — KED & ASSOCIATES

(57) ABSTRACT

A portable air purifier may include a housing provided with an inlet through which air is suctioned, a filter, and a fan module and forming an air flow path in a vertical direction, a discharge disposed at an outlet of the housing and configured to guide a discharge direction of air, a rotational supporter which is connected to the housing, movement of which is restricted, and which supports the discharge in a rotatable manner, and a rotational guide disposed respectively at the discharge and the rotational supporter and configured to guide rotation of the discharge to allow the discharge to rotate within predetermined angles.

21 Claims, 19 Drawing Sheets

(56) References Cited

U.S. PATENT DOCUMENTS

2020/0158357 A1* 5/2020 Son .................... F04D 25/166
2022/0090814 A1* 3/2022 Choi ................ B01D 46/0049

FOREIGN PATENT DOCUMENTS

| JP | 2019-504278 | 2/2019 |
| KR | 10-2013-0142451 | 12/2013 |
| KR | 10-2017-0040161 | 4/2017 |
| KR | 10-2020-0037187 | 4/2020 |
| WO | WO 2019/194637 | 10/2019 |

* cited by examiner

PORTABLE AIR PURIFIER

CROSS-REFERENCE TO RELATED APPLICATION(S)

This application claims priority to and the benefit of Korean Patent Application No. 10-2020-0093970, filed in Korea on Jul. 28, 2020, Korean Patent Application No. 10-2020-0170567, filed in Korea on Dec. 8, 2020, the disclosures of which are incorporated herein by reference in their entirety.

BACKGROUND

1. Field

A portable air purifier is disclosed herein.

2. Background

Air purifiers are devices that are widely used in our daily lives. The devices purify air by filtering physical particles, such as dust, fine dust, and ultra-fine dust, chemical substances, such as odor particles and harmful gases, and microorganisms, such as bacteria and viruses.

People cannot live without air purifiers in an industrial society as more and more people are greatly affected by fine dust and suffer from allergies. Accordingly, there is a growing demand for the devices.

Ordinarily, a large-sized air purifier is used in a house which is 100 square meters or greater. The air purifier may be provided with a filter for physical particles, such as dust, a filter for chemical substances, such as gas, and a filter for microorganisms, such as bacteria and viruses. That is, such a large-sized air purifier capable of accommodating various types of filters may be used in a large space.

However, the large-sized air purifier is rarely used in a small space, such as a studio apartment or a vehicle, for example, considering space availability, mobility, and energy efficiency. Additionally, a user who moves from place to place usually uses a small-sized air purifier. Under these circumstances, there is a growing need for a portable air purifier which is easy to carry.

The portable air purifiers need to be small and lightweight enough for users to carry such that the users may easily carry and use the portable air purifiers anywhere. That is, the portable air purifiers are useful for people who often go out and move from place to place instead of staying in a place, such as a house.

In prior art document, KR Patent Publication No. 10-2020-0037187, entitled "Portable Air Caring Apparatus" and published on Apr. 8, 2020 and which is hereby incorporated by reference, air is suctioned into a rear surface of a portable air purifier and is discharged from a front surface of the portable air purifier. The portable air purifier has a small size, such that a user may easily carry the portable air purifier. Accordingly, the portable air purifier is not provided with an additional discharge component that can rotate to adjust a discharge direction of air.

BRIEF DESCRIPTION OF THE DRAWINGS

Embodiments will be described in detail with reference to the following drawings in which like reference numerals refer to like elements, and wherein.

DETAILED DESCRIPTION

Figure 1:
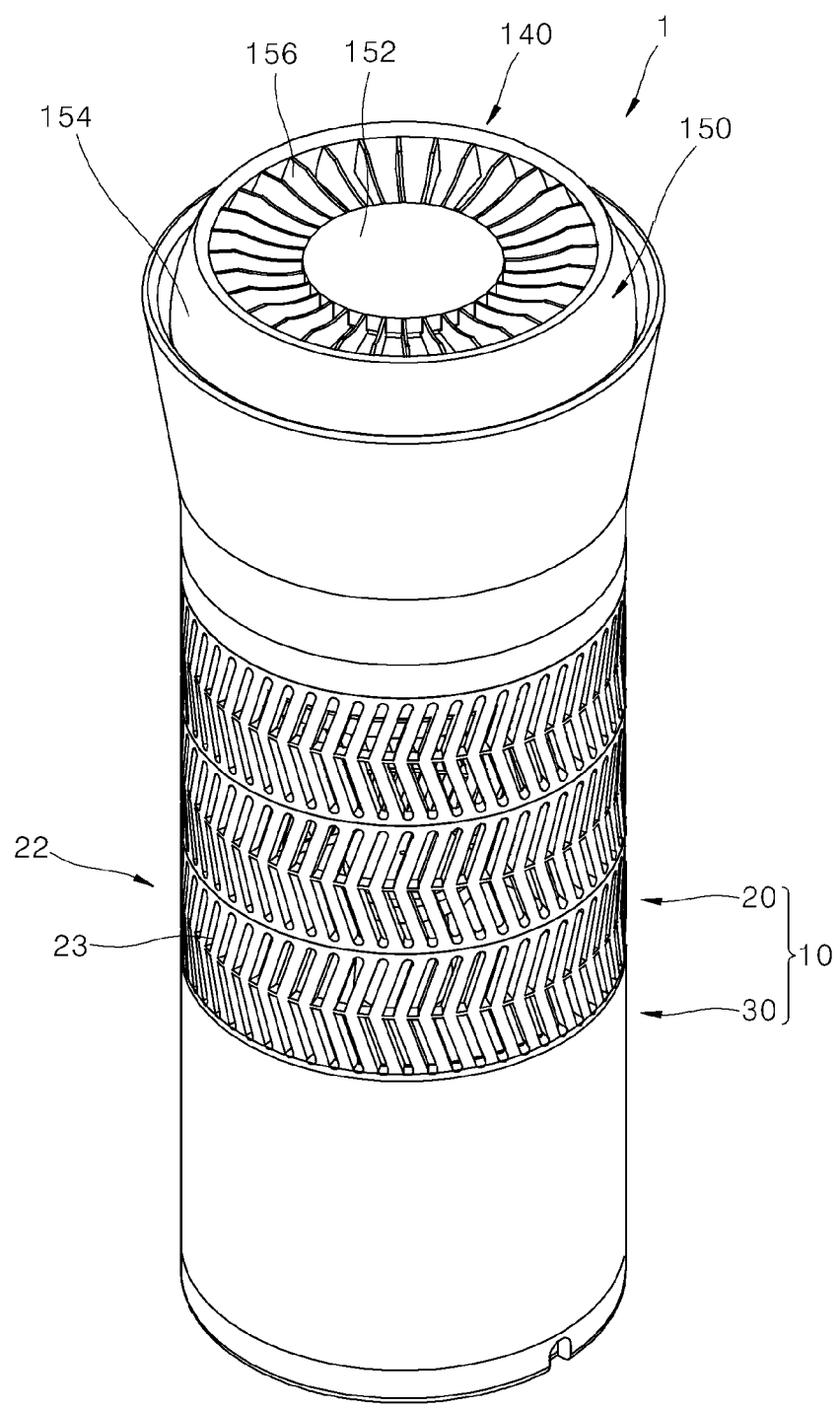
FIG. 1 is a perspective view showing a portable air purifier according to an embodiment.

Embodiments are described hereinafter with reference to the accompanying drawings such that one having ordinary skill in the art to which the embodiments pertain may easily implement the technical spirit. In the disclosure, detailed description of known technologies in relation to the subject matter has been omitted if it is deemed to make the gist unnecessarily vague. Hereinafter, embodiments are specifically described with reference to the accompanying drawings. In the drawings, identical reference numerals may denote identical or similar components.

The terms "first", "second" and the like are used herein only to distinguish one component from another component. Thus, the components should not be limited by the terms. Certainly, a first component can be a second component unless stated to the contrary.

When one component is described as being "in an upper portion (or a lower portion)" of another component, or "on (or under)" another component, one component can be placed on the upper surface (or under the lower surface) of another component, and an additional component may be interposed between another component and one component on (or under) another component.

When one component is described as being "connected", "coupled", or "connected" to another component, one component can be directly connected, coupled or connected to another component. However, it is also to be understood that an additional component can be "interposed" between the two components, or the two components can be "connected", "coupled", or "connected" through an additional component.

Throughout the disclosure, each component can be provided as a single one or a plurality of ones, unless explicitly stated to the contrary.

The singular forms "a", "an" and "the" are intended to include the plural forms as well, unless explicitly indicated otherwise. It should be further understood that the terms "comprise" or "have" and the like, set forth herein, are not interpreted as necessarily including all the stated components or steps but can be interpreted as excluding some of the stated components or steps or can be interpreted as including additional components or steps.

Throughout the disclosure, the terms "A and/or B" as used herein can denote A, B or A and B, and the terms "C to D" can denote C or greater and D or less, unless stated to the contrary.

Figure 2:
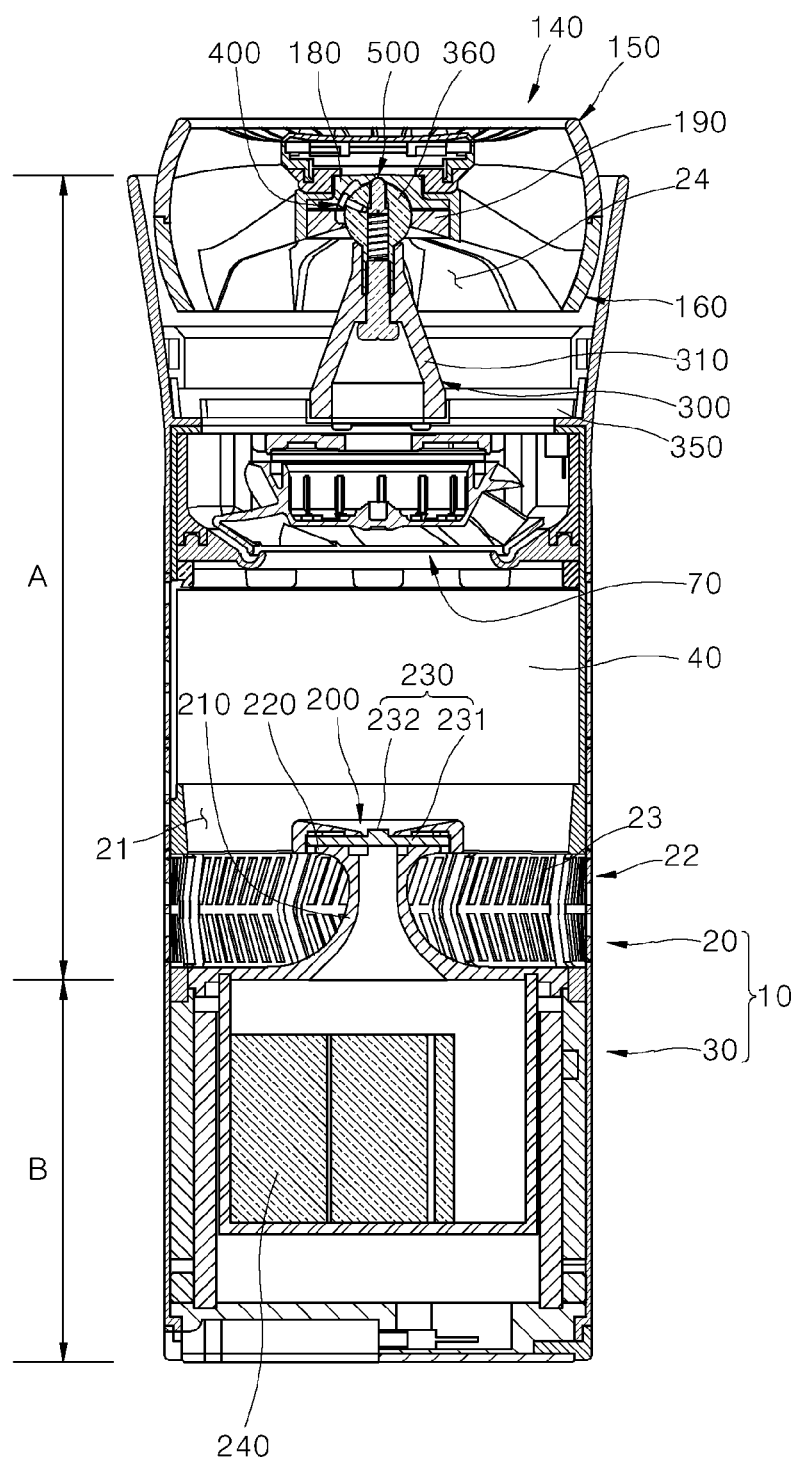
FIG. 2 is a cross-sectional view of the portable air purifier of FIG. 1.

FIG. 1 is a perspective view of a portable air purifier according to an embodiment. FIG. 2 is a cross-sectional view of the portable air purifier of FIG. 1.

As illustrated in FIGS. 1 and 2, portable air purifier 1 according to an embodiment may have an approximate cylinder shape. The portable air purifier 1 may include a housing 10, a filter 40, a fan module 70, a discharge 140, a sterilizer 200, a rotational supporter 300, and at least one of a rotational guide 400 or a position informing portion 500.

The housing 10 may be provided with an inlet 22, and the filter 40, the sterilizer 200, and the fan module 70 may be disposed inside of the housing 10. The housing 10 may form an air flow path in an vertical direction. As a cylindrical air flow path is formed inside of the housing 10, frictional resistance of air moving in the vertical direction may decrease.

Additionally, centers of the inlet 22, the filter 40, the sterilizer 200, the fan module 70, outlet 24, and the rotational supporter 300 may be aligned in the vertical direction along a reference line that passes through a center of the housing 10 in the vertical direction. Accordingly, a length of a path, in which air moves, may decrease, flow resistance of air may be reduced, and efficiency of air purification may improve, as air moving from a lower side to an upper side of the housing 10 flows linearly.

When the portable air purifier 1 is disposed on a horizontal surface, the reference line may align with a perpendicular line to the horizontal surface. The housing 10 may be made of a single member or component. However, the housing 10 may be made of a plurality of members or components, for example.

The portable air purifier 1 may be formed into a cylinder that extends in the vertical direction. Thus, a user may use the portable air purifier 1 in a state in which the portable air purifier 1 standup or lies down. Additionally, as the portable air purifier 1 may be used in a state in which the portable air purifier 1 is seated in a groove, such as a cup holder which is downwardly concave, the portable air purifier 1 may stay at a same position reliably in locations, for example, inside a vehicle that rocks.

Directions are defined as follows. Under the assumption that a portion, at which the discharge 140 is disposed with respect to a first case 20, is referred to as an upper portion, and a portion, at which a second case 30 is disposed with respect to the first case 20, is referred to as a lower portion, a "first direction" denotes a vertical or axial direction. A "second direction" is perpendicular to the first direction and denotes a lateral, horizontal, or radial direction.

The portable air purifier 1 in this embodiment may include housing 10, filter 40, a fan module 70, discharge 140, rotational supporter 300, and rotational guide 400. The portable air purifier 1 may further include position informing portion 500, sterilizer 200, and a battery 240.

The housing 10 may include first case 20 and second case 30. The first case 20 and the second case 30 may form an exterior skeleton of the portable air purifier 1. Lateral and bottom surfaces of the portable air purifier 1 may be formed by the first case 20 and the second case 30. An accommodation space 21 may be formed in the first case 20 and the second case 30. Electronic components, such as the filter 40, the fan module 70, the sterilizer 200, the rotational supporter 300, and the battery 240 may be accommodated in the accommodation space 21. The first case 20 and the second case 30 have enough strength to protect the accommodated components from external impact, for example.

The filter 40 may be installed in the accommodation space 21 of the first case 20 and disposed between the fan module 70 and the inlet 22. That is, the filter 40 may be disposed below the fan module 70, and may purify air suctioned through the inlet 22 of the portable air purifier 1. The air, which is purified while passing through the filter 40, may be discharged from an upper portion of the portable air purifier 1, passing through the fan module 70 and the discharge 140.

The filter 40 may be installed inside of the first case 20, and may purify air suctioned into the inlet 22. The filter 40 may be formed into a cylinder that extends in the vertical direction.

The filter 40 may include a single filter, or when necessary, a plurality of filters that are stacked. The filter 40 may be further provided with a filter case (not illustrated) that fixes a filter. The filter case may be fixed to an inside of the first case 20 and have an insertion space for accommodating a filter inside of the filter case.

The fan module 70 may be accommodated in the accommodation space 21 in the first case 20 and disposed between the discharge 140 and the filter 40. More specifically, the fan module 70 may be disposed between outlet 24 and the filter 40. That is, the fan module 70 may be disposed over the filter 40, and the outlet 24, the rotational supporter 300, the rotational guide 400 and the discharge 140 may be disposed over the fan module 70. The fan module 70 may suction air, introduced into a lower portion of the filter 40 through the inlet 22, and discharge the air to an upper portion of the first case 20.

A center of rotation of the discharge 140 may be aligned with a center of the fan module 70 in the vertical direction. Air suctioned through the inlet 22 may move upward, and be discharged from an upper side of the portable air purifier 1 while passing through the filter 40, the fan module 70, and the discharge 140 one after another.

In this embodiment, the fan module 70 includes a mixed flow fan, for example. The fan module 70 may suction air having passed through the filter 40 in the axial direction and discharge the air in a direction between the axial direction and the radial direction.

The discharge 140 may be disposed on an upper side of the first case 20 in a rotatable manner, and may guide a direction of discharge of air moved upward through the outlet 24. The rotational supporter 300 may be disposed over the first case 20, and the discharge 140 may be installed in the rotational supporter 300 in a rotatable manner. Both of upper and lower sides of the discharge 140 may be open. Accordingly, air, moved to a lower portion of the discharge 140 through the outlet 24, may be discharged out of the portable air purifier 1 through an upper portion of the discharge 140.

The sterilizer 200 may be disposed below the filter 40 and fixed to at least one of the first case 20 or the second case 30. The sterilizer 200 may be spaced a predetermined distance apart from the filter 40, and may emit light rays for sterilization toward the filter 40. The light rays for sterilization emitted by the sterilizer 200 may be harmful to the human body. Accordingly, a position of the sterilizer 200 may be determined such that the light rays for sterilization do not leak out of the portable air purifier 1 through the inlet 22.

The battery 240 may be disposed in the accommodation space 21 provided inside of the second case 30 and disposed below the sterilizer 200. The battery 240 may supply power to drive the portable air purifier 1.

The accommodation space 21 in the portable air purifier 1 may be divided into a first area A and a second area B. When the accommodation space 21 is divided in the vertical direction, an upper area may be the first area A, and a lower area may be the second area B. The first area A and the second area B are conceptually divided instead of being physically divided.

In one embodiment, the accommodation space 21 of the first case 20 and the accommodation space 21 in the second case 30, forming a frame of the portable air purifier 1, may be respectively referred to as first area A and second area B.

Components in relation to suction, purification, and discharge of air may be disposed in the first area A. That is, as the inlet 22, the filter 40, the fan module 70, the rotational supporter 300, and the discharge 140 are disposed in the first area A, air may flow from a lower side to an upper side in the first area A, and a discharge direction of air may be adjusted by the discharge 140 which is installed in a rotatable manner.

The inlet 22, provided with a plurality of inlet holes 23 as a passage through which air may be suctioned, may be disposed at the first case 20. The outlet 24 as a passage through which air purified in the first area A may be discharged, and the discharge 140 disposed at the rotational supporter 300 in a rotatable manner may be disposed over the first case 20. Accordingly, an air flow path connecting the filter 40, the fan module 70, and the discharge 140 may be formed inside of the first case 20.

That is, the inlet 22, the filter 40, the fan module 70, the discharge 140, the rotational supporter 300, a rotation informing portion, and the outlet 24 may be installed in the first area A. A flow path for air suctioned into the portable air purifier 1 to pass through the air purifier may be formed in the first area A.

Components, which do not directly relate to an air flow for purifying air, may be disposed in the second area B. That is, a controller including a printed circuit board (PCB) and the battery 240, for example, may be installed in the second area B.

In this embodiment, the hosing 10 may be formed into a cylinder having a vertical length greater than a horizontal length. The first area A in the upper portion may have a vertical length greater than a vertical length of the second area B in the lower portion. That is, when the portable air purifier 1 stands vertically, the first area A in the upper portion make take up more space than the second area B in the lower portion.

As the discharge 140 is disposed at the rotational supporter 300 in a rotatable manner, a discharge direction of air purified in the upper portion of the portable air purifier 1 may be readily adjusted. Accordingly, the air purified in the portable air purifier 1 may reach the face of a user more easily.

When the portable air purifier 1 is located and used on a bottom surface placed further downward than the face of the user, the portable air purifier 1 may stand vertically rather than lie transversely to allow more air, purified in the portable air purifier 1, to reach the face of the user. When air is discharge from the upper portion of the portable air purifier 1 through the discharge 140 rotated in a predetermined direction in a state in which the portable air purifier 1 stands vertically, more air purified in the portable air purifier 1 may reach the face of the user.

The portable air purifier 1 according to an embodiment may include at least one of housing 10, filter 40, fan module 70, discharge 140, rotational supporter 300, rotational guide 400, or position informing portion 500. The portable air purifier 1 according to an embodiment may further include sterilizer 200 and battery 240.

The housing 10 may include first case 20 and second case 30, and the first case 20 may have accommodation space 21 therein and be provided with inlet 22 on a lateral surface of a lower portion thereof. The first case 20 may have a cylinder shape and have upper and lower sides open. The first case 20 may be made of a single member or component, or when necessary, of a plurality of members or components. The first case 20 according to an embodiment may be made of a plurality of members or components, and the members or components may be coupled in various ways, such as fitted-coupling, coupling with an adhesive, welding, or connection with a fastening member 195, such as a bolt, for example.

Additionally, air may be suctioned through the lateral surface of the lower portion of the first case 20 and discharged through the upper side of the first case 20. The inlet 22 provided with inlet holes 23 may be disposed along a circumference of the lower portion of the first case 20, and outlet 24 through which air is discharged may be disposed on the upper side of the first case 20.

In a state in which the inlet 22 is disposed along an outer circumference of the first case 20, filter 40 may be disposed on an upper side spaced from the inlet 22. Accordingly, air may flow uniformly across the entire surface area of the filter 40.

The inlet 22 may have a plurality of inlet holes 23, and the inlet holes 23 may be disposed at a slant in the form of an oblique line, and when necessary, may form a hole in the form of an inequality symbol that is bent at a center. The inlet holes 23 may be modified in various ways, for example, may be additionally formed on a lateral surface of the housing 10, on which the filter 40 is disposed, to increase a flow rate of air flowing into the filter 40.

Further, the housing 10 may be modified in various ways, that is, may include three or more members.

The second case 30 may connect to the lower portion of the first case 20 and may be modified in various ways within the technical scope in which a space for installing electronic components including the battery 240 is formed inside of the second case 30.

At least one of the first case 20 or the second case 30 may be formed into a cylindrical case. Both the first case 20 and the second case 30 may have a cylindrical shape or the second case 30 may only have a cylindrical shape. When necessary, the first case 20 may only have a cylindrical shape.

In a case of the second case 30 having a cylinder shape and extending in the vertical direction, the user may readily hold an outer circumference of the second case 30 with a hand, and the second case 30 may be easily held in a vehicle's cup holder provided with a groove having a circular cross-section. In the case of the first case 20 having a cylinder shape, friction, caused as a result of contact between air, which moves upward while passing through the first case 20, and the inside of the first case 20 having a curved shape, may be reduced, thereby enabling the air to flow more smoothly.

Additionally, an air flow path may be formed inside of the first case 20, and no air flow path may be formed inside of the second case 30. Accordingly, air may be smoothly suctioned and discharged through the first case 20 even when the second case 30 is held in the cup holder or a user's hand, thereby ensuring improvement in usability.

The filter 40 may be installed inside of the first case 20 and modified in various ways within the technical scope in which the filter 40 purifies air suctioned into the inlet 22. The filter 40 according to an embodiment may have a cylinder shape.

The first case 20 may have a circular pipe shape, and the filter 40 installed inside of the first case 20 may have a cylinder shape contacting an inside of the first case 20. Accordingly, impurities of air passing through the first case 20 may be effectively removed.

In addition, the filter 40 may have a circular cross-section and occupy a largest area inside of the first case 20. In addition, the filter 40 may be manufactured in a cylindrical shape, and when an upper side and a lower side of the filter 40 are cut, pressure loss may be minimized, thereby maximizing a performance of the filter 40.

In addition, an outer diameter of the filter 40 may be manufactured to be larger than a suction diameter of bell mouth 132 to guide air suctioned into mixed flow fan module 70, thereby maximizing a volume of the filter 40.

In this embodiment, the filter 40, the fan module 70, and the discharge 140 may be disposed along the housing 10 in the vertical direction, and air may also flow in the vertical direction. That is, an air flow resulting from operation of the fan module 70 may be performed in a same linear direction as the direction in which the filter 40, the fan module 70, and the discharge 140 are disposed.

As a result of the linear flow of air, resistance against an air flow may be reduced, and a smooth air flow may be ensured. Thus, a sufficient amount of air may be suctioned and a sufficient amount of air corresponding to the sufficient amount of the suctioned air may be discharged by the fan module 70, thereby ensuring improvement air purification performance of the portable air purifier 1.

The fan module 70 may be disposed between the filter 40 and the outlet 24 and modified in various ways within the technical scope in which the fan module 70 rotates a fan to blow air toward the outlet 24.

Figure 8:
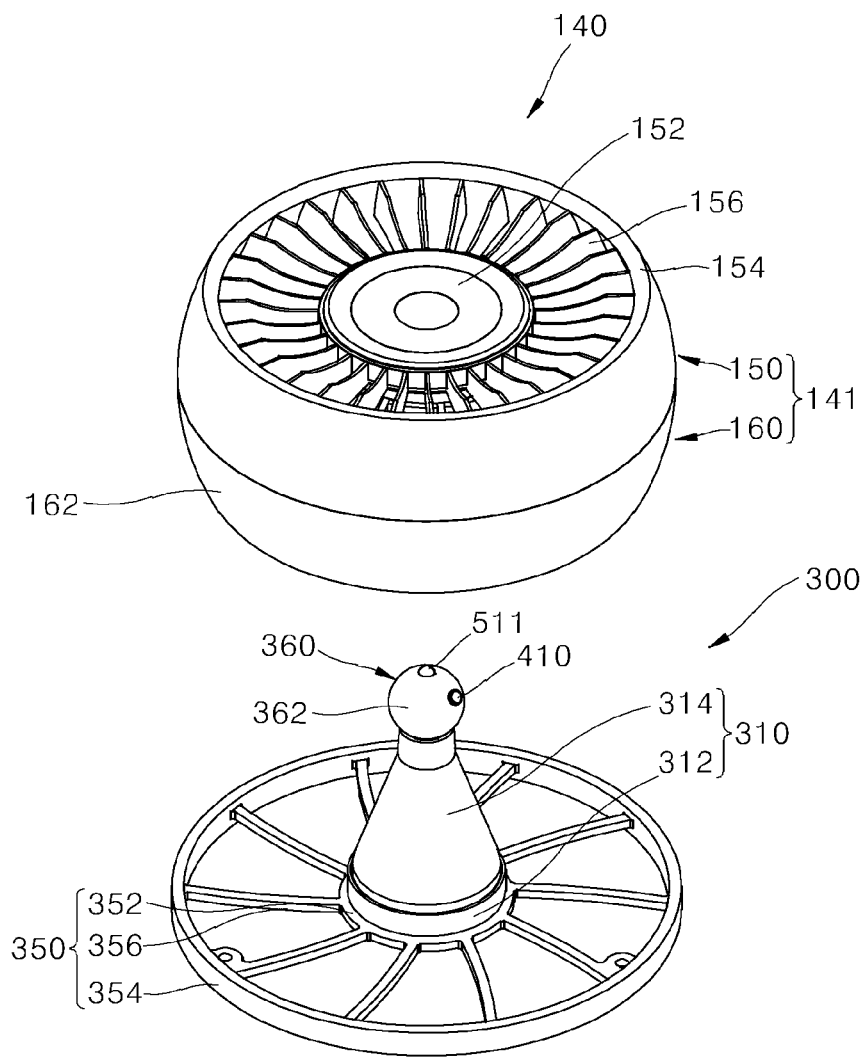
FIG. 8 is a perspective view of the discharge and the rotational supporter according to an embodiment.
Figure 9:
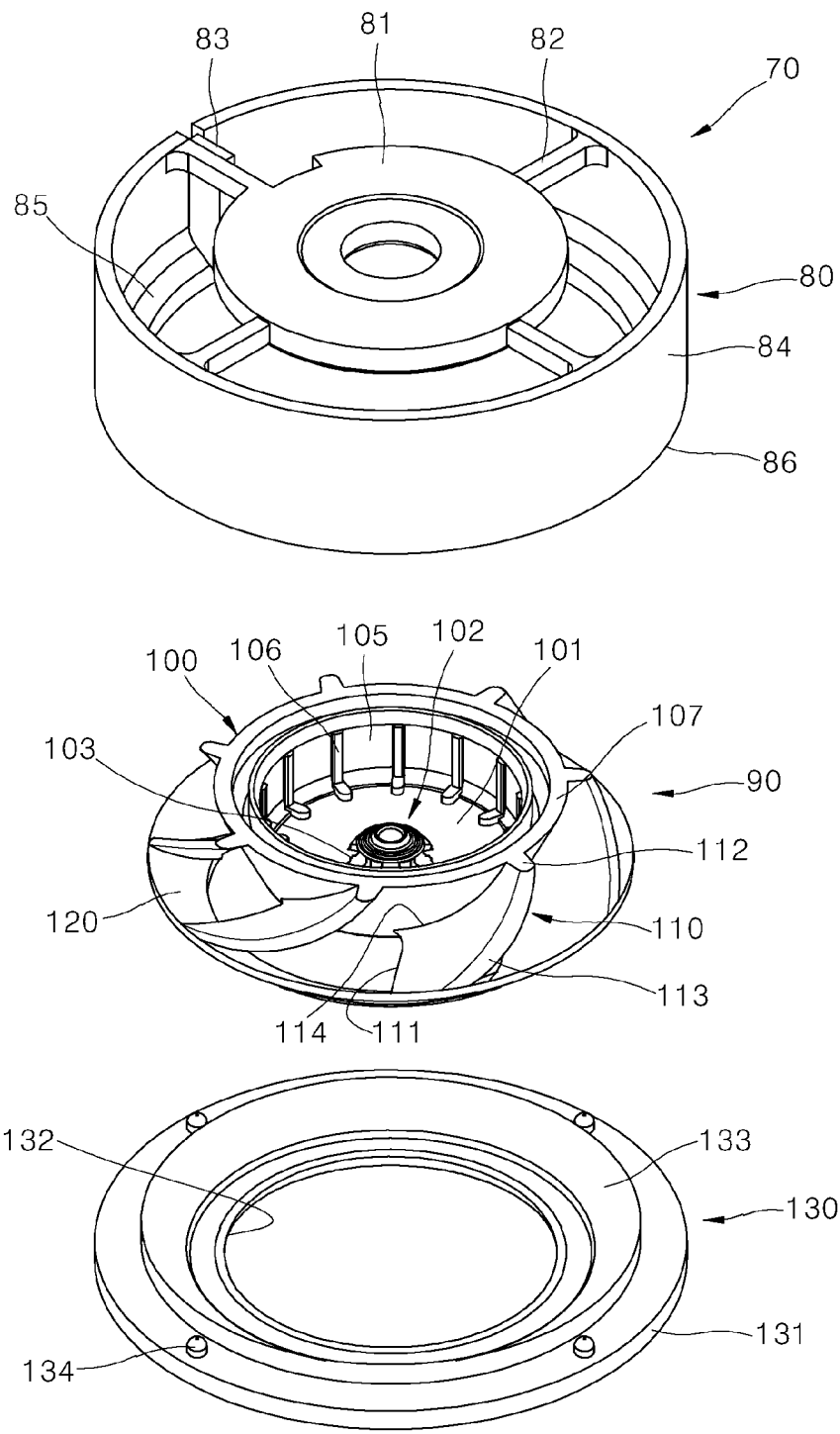
FIG. 9 is an exploded perspective view of a fan module according to an embodiment.
Figure 10:
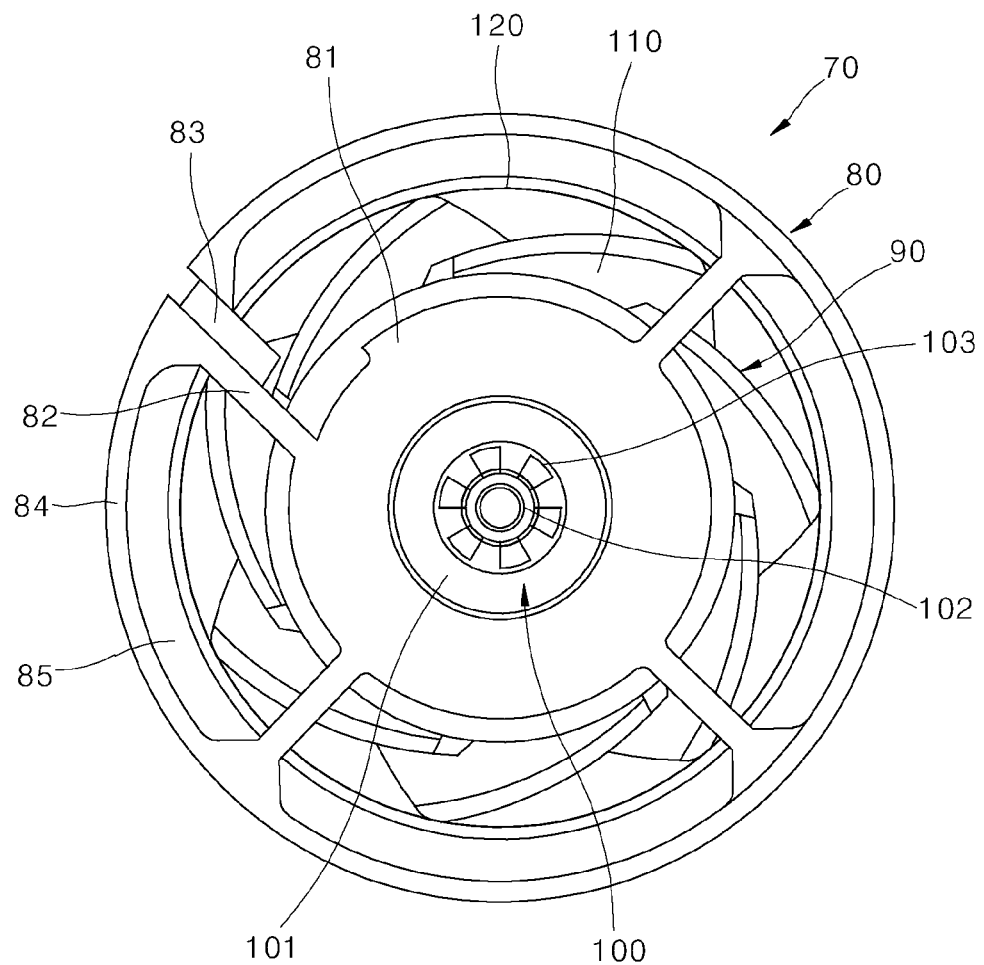
FIG. 10 is a plan view of the fan module of FIG. 9.
Figure 11:
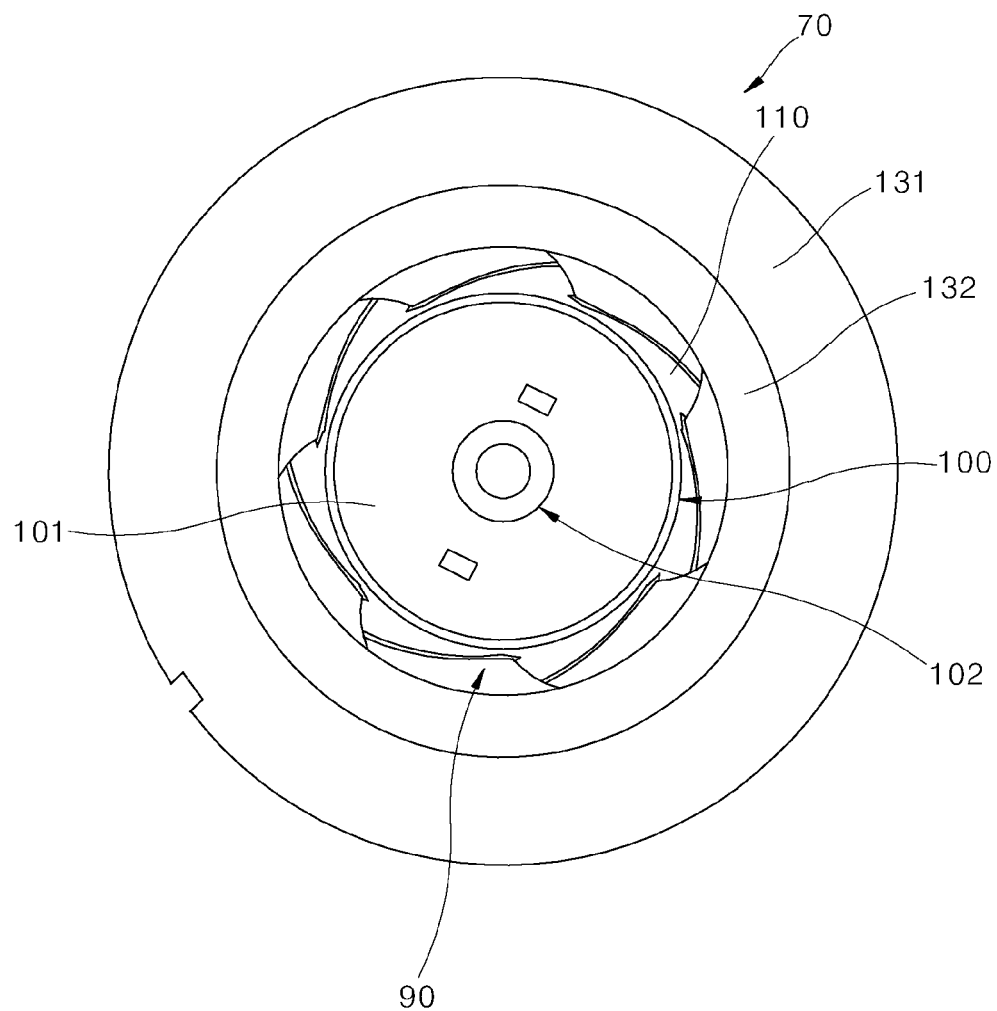
FIG. 11 is a bottom view of the fan module of FIG. 9.
Figure 12:
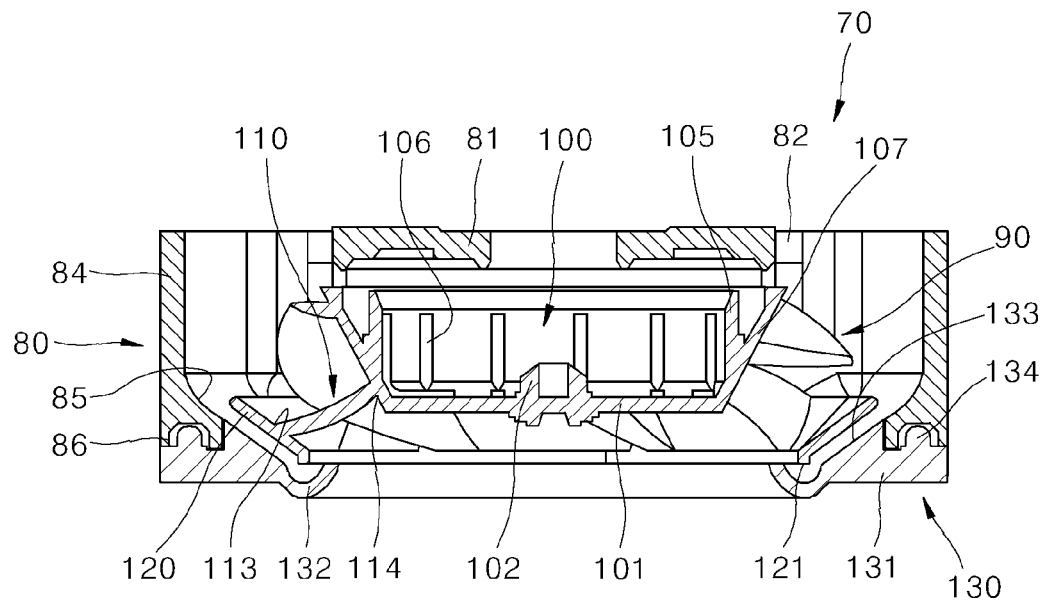
FIG. 12 is a cross-sectional view of the fan module of FIG. 9.

FIG. 8 is a perspective view of the discharge and the rotational supporter according to an embodiment. FIG. 9 is an exploded perspective view of a fan module according to an embodiment. FIG. 10 is a plan view of the fan module of FIG. 9. FIG. 11 is a bottom view of the fan module of FIG. 9. FIG. 12 is a cross-sectional view of the fan module of FIG. 9.

As illustrated in FIGS. 8 to 12, the fan module 70, a circular mixed flow fan module, may be applied, and a shape of the fan module 70 may match or correspond to a cylinder shape of the inside of the first case 20. Accordingly, the first case 20 need not be scaled-up despite fixation or coupling of the fan module 70, thereby enabling a compact product. Additionally, when the portable air purifier 1 according to an embodiment is applied to a vehicle, the portable air purifier 1 may be small enough to fit into a cup holder.

As the circular mixed flow fan module is applied to the fan module 70, a small-sized upward discharge-type air purifier, which ensures maximized hydrodynamic performance, may be provided. A fan type of the fan module 70 may be a mixed flow fan, and an inner structure of the fan module 70 may change to mount the mixed flow fan.

A fan 90 according to embodiments may rotate as a result of an operation of a motor. A rotational shaft of the motor configured to rotate the fan 90 may only connect to the fan 90. A rotor may be installed in the fan 90, and a stator may be installed in the fan housing 80, rotation of which is restricted. As a magnetic field of the stator changes, the shaft connected to the fan 90 may rotate along with the rotor such that the rotor and the fan 90 rotate around the stator. The configuration of the motor for rotating the fan 90 is well known. Thus, detailed description thereof has been omitted.

The fan module 70 according to an embodiment may include a fan housing 80, fan 90, and a fan base 130. The fan housing 80 may be fixed to the inside of the first case 20, and may be modified in various ways within the technical scope in which the fan housing 80 is provided therein with enough space for the fan 90 to rotate. The fan housing 80 according to an embodiment may include at least one of a support plate 81, a connecting and supporting portion 82, a wire guide 83, a lateral surface supporter 84, an inner guide 85, and a protruding boss 86.

The support plate 81 may be formed into a circular plate and provided with a hole at a center thereof. A motor may be disposed at the center of the support plate 81 or the shaft connected to the motor may be disposed in the first direction. The support plate 81 may be disposed on a lower side of a core 310.

The connecting and supporting portion 82 may extend outside the support plate 81 and connect to the lateral surface supporter 84. A plurality of connecting and supporting portions 82 according to an embodiment may be provided and formed into a rod. The connecting and supporting portion 82, extending outside of the support plate 81 in a radial direction of the support plate 81, may connect to the lateral surface supporter 84.

The connecting and supporting portion 82 according to an embodiment may be disposed on a lower side of a core supporter 350 of the rotational supporter 300. Four connecting and supporting portions 82 may be disposed around the support plate 81 at 90-degree intervals, and the core supporter 350 may be disposed on an upper side of the connecting and supporting portion 82 to face the connecting and supporting portion 82.

The wire guide 83 and the connecting and supporting portion 82 may be disposed one after another, and the wire guide 83 may support a lower portion of an electric wire 600 of an electronic device, such that the electric wire 600 moves along a lateral surface of the connecting and supporting portion 82. The wire guide 83 may be formed into a projection that is disposed on a lower side of the lateral surface of the connecting and supporting portion 82 and may guide the electric wire 600 of a motor installed in the support plate 81 in a way that the electric wire 600 extends and is disposed outside the fan housing 80. The wire guide 83 may form a concave groove which is disposed on the lateral surface of the connecting and supporting portion 82 and in which the electric wire 600 is installed. Accordingly, the electric wire 600 installed in the wire guide 83 may be disposed in the concave groove on the lateral surface of the connecting and supporting portion 82 and supported by the wire guide 83, thereby preventing the electric wire 600 from being damaged.

The lateral surface supporter 84 may be in the form of a cylindrical pipe and have upper and lower sides that are open. An outside of the lateral surface supporter 84 may contact an inside of the housing 10, and an inside of the lateral surface supporter 84 may connect to the connecting and supporting portion 82.

The inner guide 85 may form an inclined surface which is disposed downward at a slant from a lower side of the lateral surface supporter 84 toward the inside of the lateral surface supporter 84 in a radial direction of the lateral surface supporter 84. The inner guide 85 may be formed inside of the lateral surface supporter 84 and may prevent air, blown upward by the fan 90, from moving to an entrance of the fan 90 through an outer surface of the fan 90, that is, prevent a whirl.

The protruding boss 86 may extend to a lower end of the lateral surface supporter 84, and may be modified in various ways within the technical scope in which the protruding boss 86 is provided with a groove into which a coupling projection 134 of a fan base 130 described hereinafter may be inserted. A plurality of protruding bosses 86 according to an embodiment may be disposed in a circumferential direction of the lateral surface supporter 84.

The fan 90 may be disposed inside of the fan housing 80 in a rotatable manner, and may be modified in various ways within the technical scope in which the fan 90 moves air toward the discharge 140. A mixed flow fan may be used as the fan 90 according to an embodiment; however, embodiments are not limited thereto. Another type of fan may be used as the fan 90. The fan 90 according to an embodiment may include at least one of hub 100, a plurality of fan blades 110 or a shroud 120.

Figure 13:
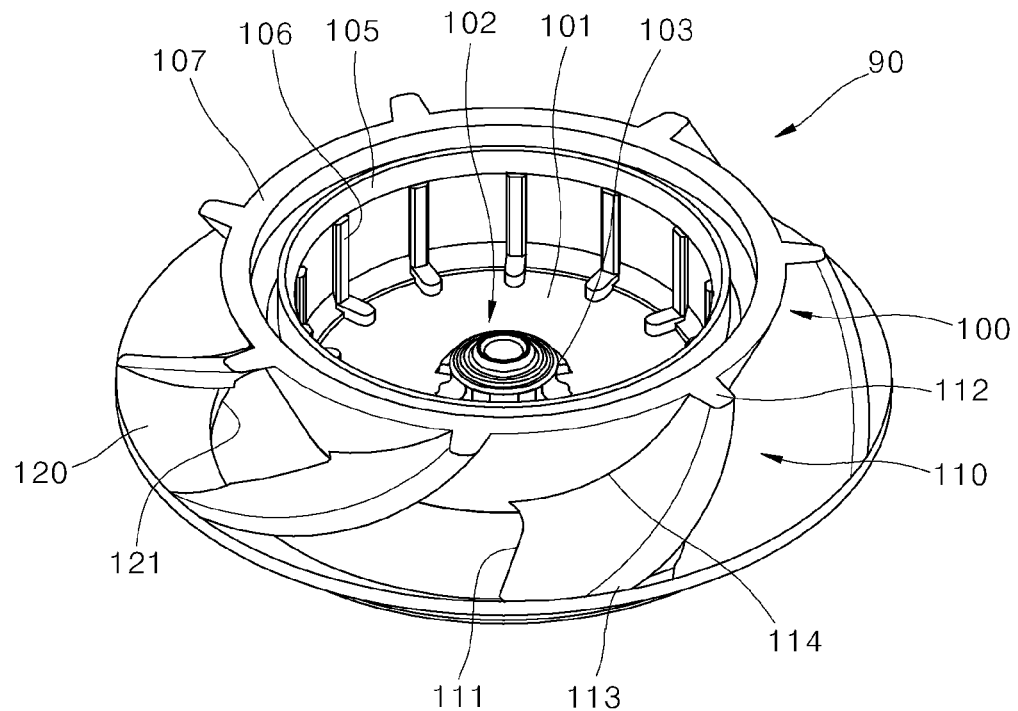
FIG. 13 is a perspective view of a fan according to an embodiment.
Figure 14:
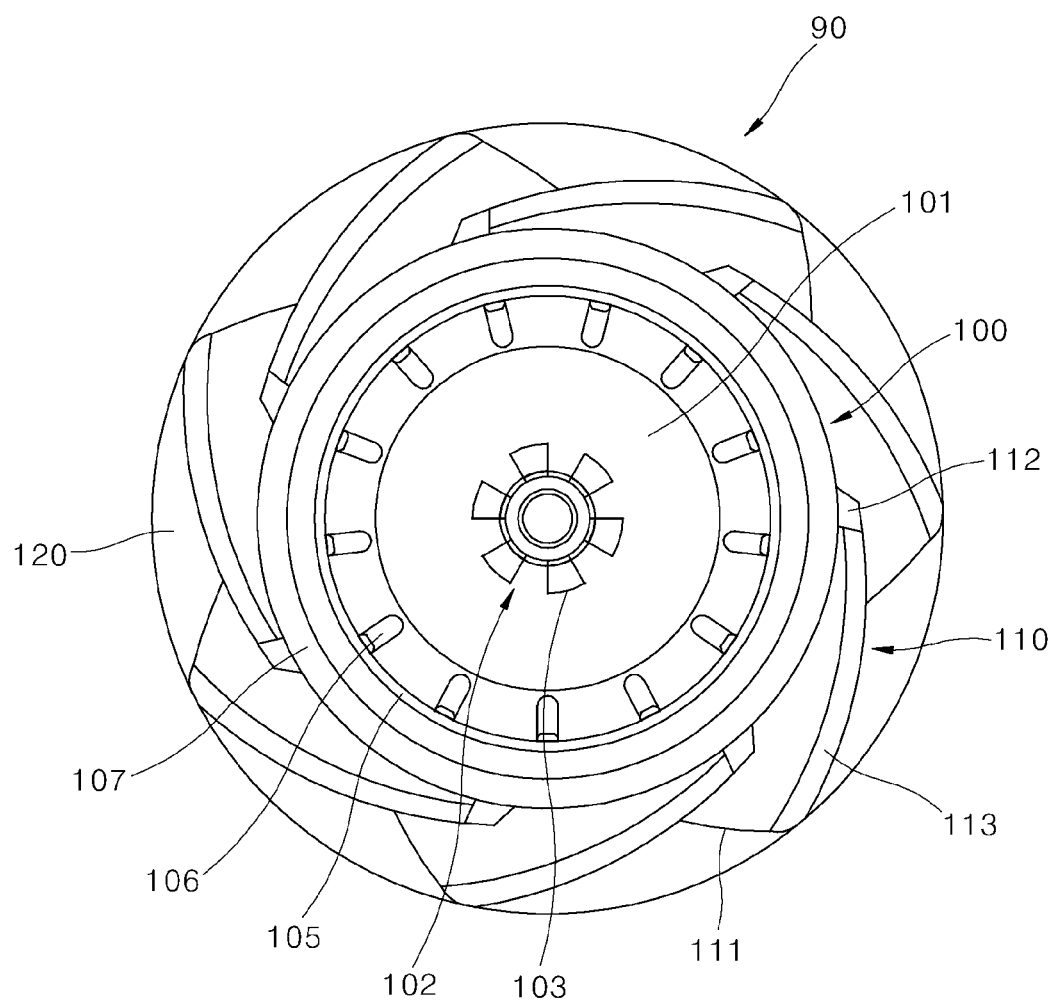
FIG. 14 is a plan view of the fan of FIG. 13.
Figure 15:
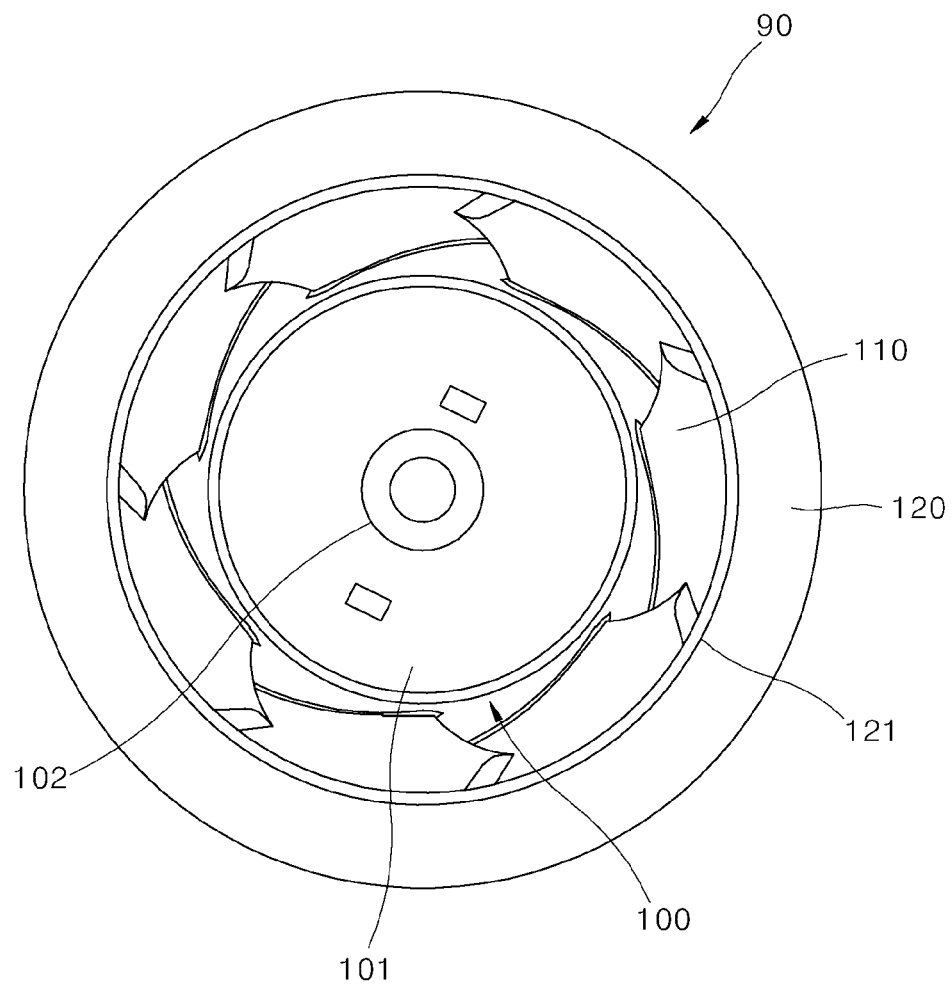
FIG. 15 is a bottom view of the fan of FIG. 13.
Figure 16:
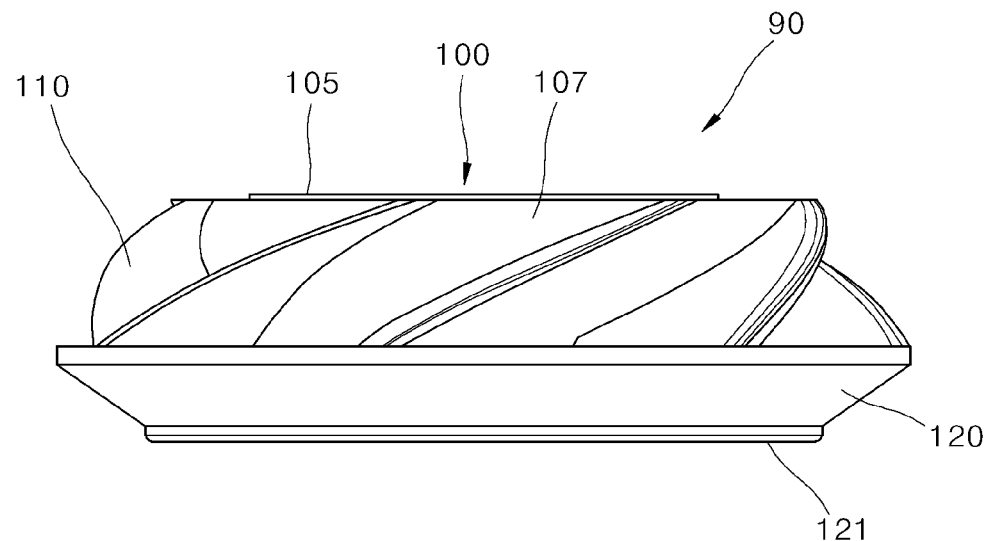
FIG. 16 is a front view of the fan of FIG. 13.
Figure 17:
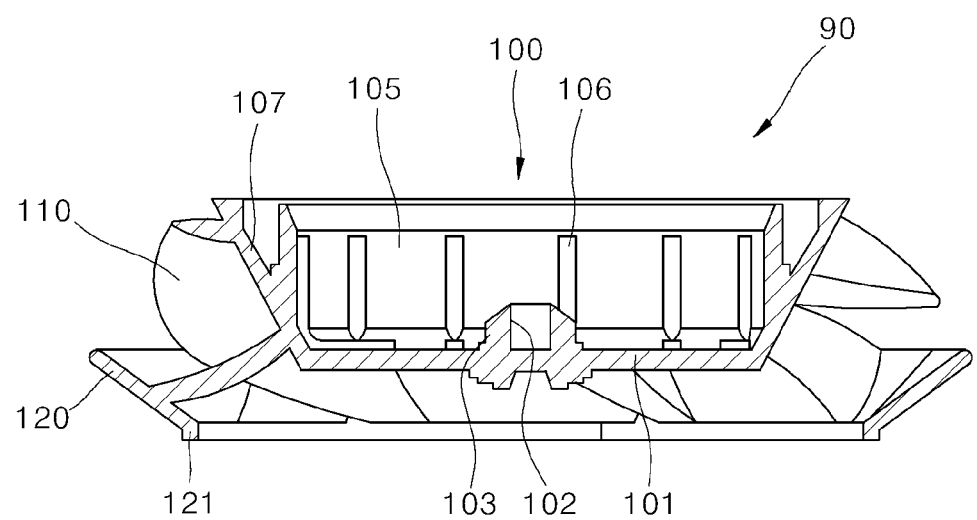
FIG. 17 is a cross-sectional view of the fan of FIG. 13.

FIG. 13 is a perspective view showing a fan according to an embodiment. FIG. 14 is a plan view of the fan of FIG. 13. FIG. 15 is a bottom view of the fan of FIG. 13. FIG. 16 is a front view of the fan of FIG. 13. FIG. 17 is a cross-sectional view of the fan of FIG. 13.

As illustrated in FIGS. 13 to 17, the hub 100 may be disposed at a center of the fan housing 80, and may be modified in various ways within the technical scope in which the hub 100 receives external power and rotates. The hub 100 may be disposed at a center of the fan 90 in a radial direction of the fan 90, and may rotate along with the rotor constituting the motor and the shaft which is an output shaft of the motor. The hub 100 according to an embodiment may include at least one of a hub plate 101, a shaft coupler 102, an inner protrusion 105, or a skirt 107.

The hub plate 101 may be formed into a circular plate and be parallel with the support plate 81. The hub plate 101 may be provided with the shaft coupler 102. The shaft coupler 102 may be disposed at a center of the hub plate 101 in a radial direction of the hub plate 101. The shaft coupler 102 may protrude from an upper side and a lower side of the hub plate 101.

The shaft coupler 102 may be coupled to an end of the shaft, configured to deliver rotational power, in an axial direction of the shaft. For example, the shaft coupler 102 may be coupled to the shaft in a way that the shaft is fitted into the shaft coupler 102.

A first reinforcing projection 103 may be disposed along an outer circumference of the shaft coupler 102 at predetermined intervals. The first reinforcing projection 103 may be radially disposed around the shaft coupler 102, and may form a strip-shaped projection outside the shaft coupler 102. Accordingly, stress concentrated on the shaft coupler 102 may be scattered through the first reinforcing projection 103, and structural rigidity of the shaft coupler 102 may improve.

The inner protrusion 105 may protrude upward from the hub plate 101 to an upper portion in which the support plate 81 is installed. The inner protrusion 105 according to an embodiment may be disposed along an outer edge of the hub plate 101 in a circular arc form. The inner protrusion 105 may be in the form of a pipe that extend in the vertical direction.

Additionally, a second reinforcing projection 106 may be disposed along an inner circumference of the inner protrusion 105 at predetermined intervals. The second reinforcing projection 106 may be disposed along an inner surface of the inner protrusion 105 in the first direction, and a lower side of the second reinforcing projection 106 may form a strip-shaped projection that extends toward the shaft coupler 102. Accordingly, stress concentrated on the inner protrusion 105 may be scattered through the second reinforcing projection 106, and structural rigidity of the inner protrusion 105 may improve. When necessary, the rotor of the motor may be fixed to an inside of the inner protrusion 105.

The skirt 107 may protrude upward from an edge of the hub plate 101 to the support plate 81. The skirt 107 may form an inclined surface which is inclined outward in the second direction as the skirt 107 extends away from the hub plate 101 in the first direction. The skirt 107 may be disposed outside of the inner protrusion 105, and an inner diameter of the skirt 107 may increase gradually from a lower side to an upper side.

For example, a shape, in which the hub plate 101 and the skirt 107 connect, may be a truncated cone shape which is provided therein with a hole and has one side open. The skirt 107 may be formed into a funnel having an upper side open and a lower side blocked by the hub plate 101.

The shroud 120 may be installed in such a way that the shroud 120 connects to ends of the plurality of fan blades 110 in a ring shape, and may be modified in various ways within the technical scope in which the shroud 120 is spaced from the fan base 130.

The shroud 120 may be arranged along an outer circumference of the skirt 107, and the shroud 120 and the skirt 107 may be connected by the plurality of fan blades 110. Additionally, an outer diameter of the hub 100 and an inner diameter of the shroud 120 may decrease gradually from an upper side to a lower side.

The shroud 120 may be spaced a predetermined distance from the hub 100 in the radial direction and may be disposed outside of the hub 100 in the radial direction of the hub 100. The shroud 120 may be spaced from the hub 100 by a distance corresponding to a length of the fan blade 110 in a radial direction of the fan blade 110. Each fan blade 110 may connect between the skirt 107 included in the hub 100 and the shroud 120.

The shroud 120 may form an inclined surface which is approximately parallel with the skirt 107. In this embodiment, the skirt 107 and the shroud 120 are arranged in such a way that a gap between the skirt 107 and the shroud 120 increases gradually toward an upper side of the shroud 120, for example.

An inlet projection 121 disposed on a lower side of the shroud 120 may be formed into a ring and may extend from the lower side of the shroud 120 having a funnel shape in the first direction. As the inlet projection 121 is disposed inside of bell mouth 132 described hereinafter, air, flowing into an inlet on the lower side of the shroud 120 along an outer side of the shroud 120, may be prevented from whirling.

The plurality of fan blades 110 may be spaced along an outer circumferential surface of the hub 100 at regular intervals. Each fan blade 110 may protrude outside of the hub 100 with respect to the hub 100, and extend in a spiral form. The plurality of fan blades 110 may be spaced a predetermined distance apart from each other in a circumferential direction of the hub 100.

The fan blade 110 according to an embodiment may protrude outside of the skirt 107 in a centrifugal direction extending from a center of the shaft coupler 102 in a spiral shape. Under the assumption that a direction from the outside of the shaft coupler 102 toward the shaft coupler 102 is a radial direction, an inside of the fan blade 110 in a radial direction of the fan blade 110 may connect to the skirt 107, and an outside of the fan blade 110 in the radial direction of the fan blade 110 may connect to the shroud 120 described hereinafter.

The skirt 107 may be a portion directly connected to the fan blade 110 among the components of the hub 100 and directly contacting air passing through the fan blade 110. The skirt 107 may closely relate to a path in which air passing through the fan module 70 flows.

Each fan blade 110 connecting the shroud 120 and the skirt 107 may include a first end portion 111, a second end portion 112, a first edge 113, and a second edge 114.

The first end portion 111 may be disposed at a front end of the fan wing 110 in a rotational direction of the fan blade 110, and formed into a straight line that extends in the radial direction. The rotational direction may be defined as a direction in which the fan 90 rotates. The second end portion 112 may be disposed at a rear end of the fan blade 110 in the rotational direction of the fan blade 110 and formed radially around the shaft coupler 102.

The first edge 113 may connect one or a first end of the first end portion 111 and one or a first end of the second end portion 112. The first edge 113 may connect to an inner circumferential surface of the shroud 120.

The second edge 114 may connect the other or a second end of the first end portion 111 and the other or a second end of the second end portion 112. The second edge 114 may connect to the outer circumferential surface of the hub 100.

That is, the first end of the first end portion 111 and the first end of the second end portion 112 may connect to the inner circumferential surface of the shroud 120. The second end of the first end portion 111 and the second end of the second end portion 112 may connect to an outer circumferential surface of the skirt 107.

The first end of the first end portion 111 may be disposed closer to the center of the hub plate 101 in a radial direction of the hub plate 110 than the first end of the second end portion 112, and the second end of the second end portion 112 may be disposed closer to the center of the hub plate 101 in the radial direction of the hub plate 110 than the second end of the first end portion 111, as the first end and the second end of the first end portion 111 are disposed further forward than the first end and the second end of the second end portion 112 in the rotational direction and a radius of the skirt 107 decreases toward a front in the radial direction.

In this embodiment, the fan blade 110 may connect to the skirt 107 of the hub 110. The skirt 107 may form an inclined surface which is inclined upward, to guide a flow of air, flowing into the fan module 70, upward at a slant.

As illustrated in FIG. 9, the fan base 130 may be coupled to a lower side of the fan housing 80, and may be modified in various ways within the technical scope in which the fan base 130 guides air having passed through the filter 40 into the fan 90.

The fan base 130 may be disposed between the filter 40 and the fan 90. An edge of the fan base 130 may have a shape corresponding to a shape of an edge of the filter 40. For example, when the filter 40 has a cylinder shape and the edge of the filter 40 has a circular shape, the fan base 130 may have a ring shape with a hole.

A base plate 131 may be disposed between the filter 40 and the fan 90. The base plate 131 may be formed into a plate that extends in a ring shape and provided with a hole for movement of air at a center thereof.

Bell mouth 132 may be installed in an annular shape on an inside of the base plate 131. The bell mouth 132 may have a longitudinal cross-section that is concave and encircles a lower side of the inlet projection 121 of the shroud 120 and may extend in a circumferential direction.

The bell mouth 132 may be formed in a way that the bell mouth 132 encircles an outer circumferential surface of the hole formed at a center of the base plate 131. The bell mouth 132 may form a groove which is convex downward and concave upward.

The bell mouth 132 may be at least partially inserted into the shroud 120 in a radial direction of the shroud 120. The bell mouth 132 may guide a suction flow at an entrance of the fan module 70 and contribute to improvement in suction and discharge performance of the fan module 70.

A coupling projection 134 may protrude from the base plate 131 upward and be fitted-coupled to the groove of the protruding boss 86 of the fan housing 80 to fix the fan base 130 to the lower side of the fan housing 80. As a result of the coupling between the coupling projection 134 and the protruding boss 86, the fan base 130 and the fan housing 80 may be coupled at a plurality of positions. When the fan base 130 and the fan housing 80 are coupled as described above, the fan 90 may be installed between the fan base 130 and the fan housing 80 in a rotatable manner.

A protruding rib 133 may protrude from the base plate 131 and be disposed outside of the bell mouth 132 in a radial direction of the bell mouth 132. The protruding rib 133 according to an embodiment may be disposed outside of the bell mouth 132 in the radial direction of the bell mouth 132 and installed in the form of a ring that encircles an outer circumference of the bell mouth 132. The protruding rib 133 and the base plate 131 may be integrally formed. More specifically, the base plate 131, the bell mouth 132, and the protruding rib 133 may be integrally formed.

Additionally, the protruding rib 133 may be disposed at a slant at a same angle as that of an outer surface of the shroud 120, and a gap between the protruding rib 133 and the shroud 120 may remain constant. The protruding rib 133 may protrude in the form of an inclined surface. The inclined surface of the protruding rib 133 may be spaced a predetermined distance from the shroud 120 and be parallel with the inclined surface of the shroud 120.

Additionally, the inclined surface of the protruding rib 133 may have the same slant angle as the inclined surface of the inner guide 85 of the fan housing 80. Accordingly, a portion of air, moving upward through a space between the shroud 120 and the skirt 107, may be prevented from moving to the entrance of the fan 90 through the space between the shroud 120 and the protruding rib 133, that is, prevent a whirl.

Figure 18:
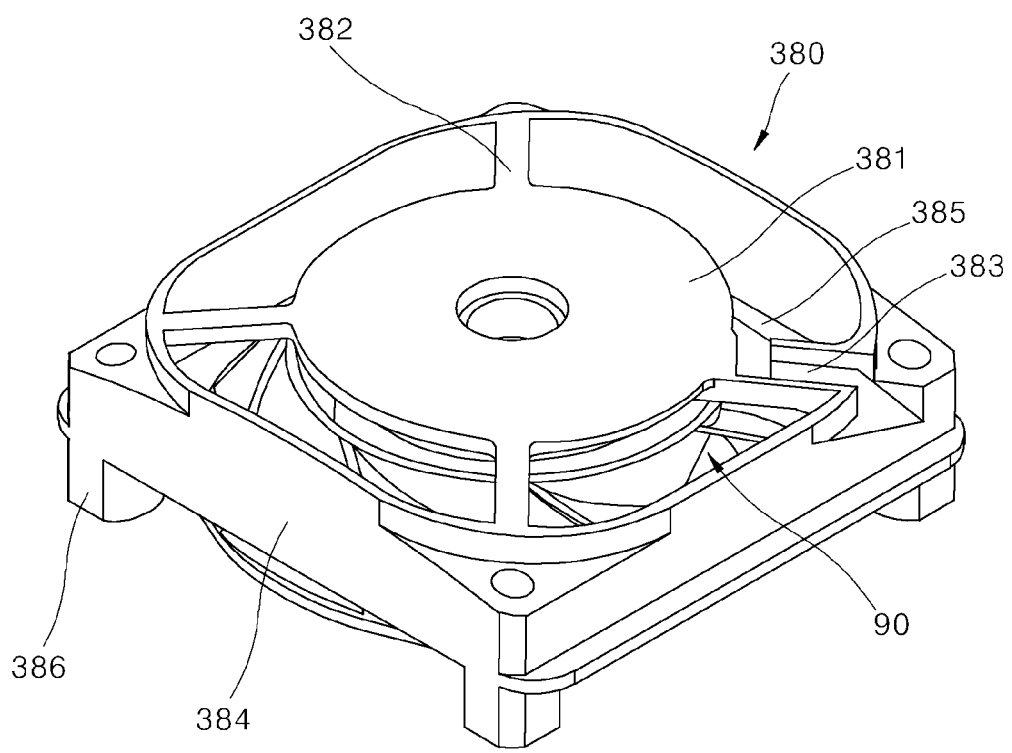
FIG. 18 is a perspective view of a fan module according to another embodiment.
Figure 19:
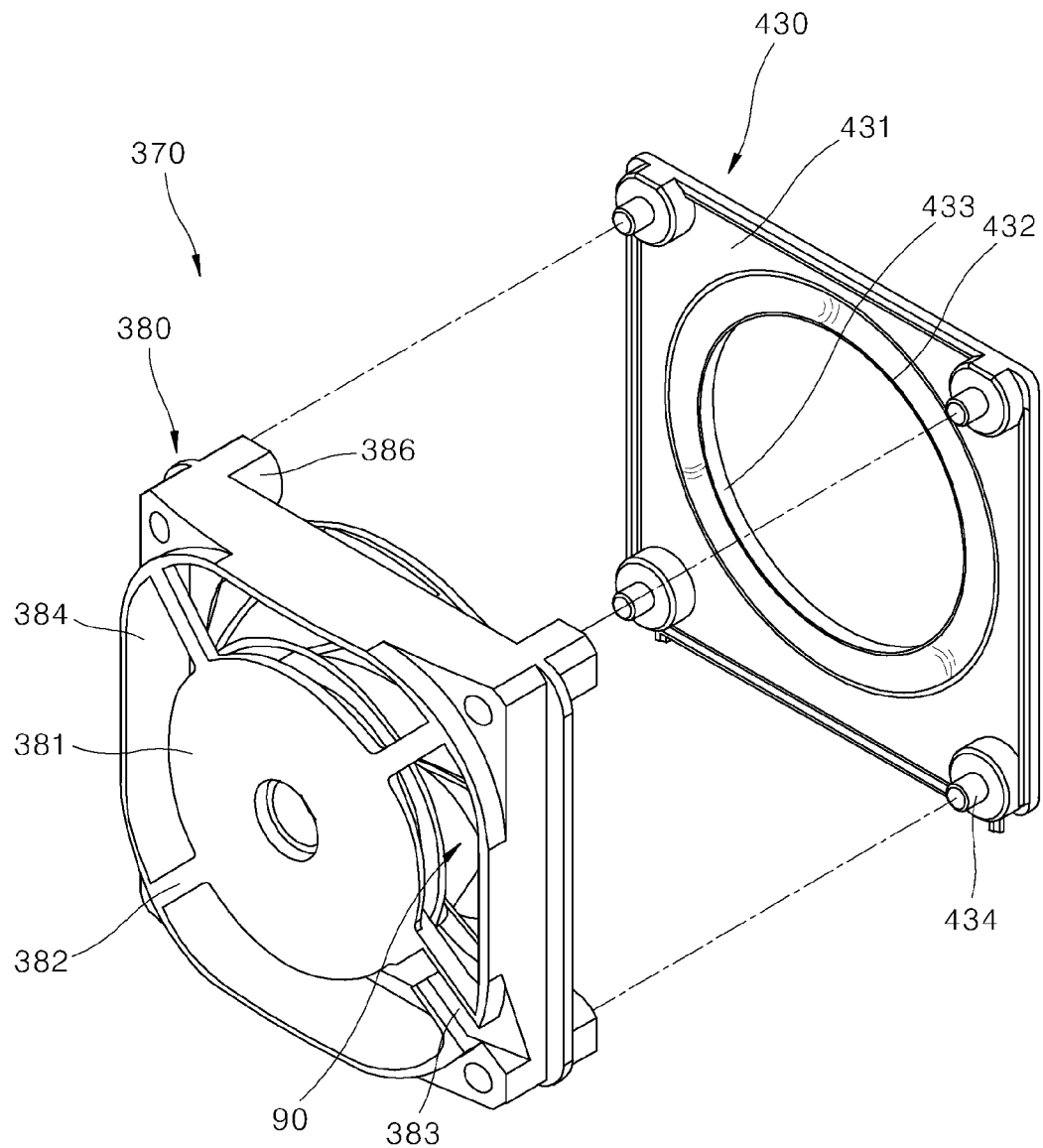
FIG. 19 is an exploded perspective view of the fan module of FIG. 18.

FIG. 18 is a perspective view of a fan module according to another embodiment. FIG. 19 is an exploded perspective view of the fan module of FIG. 18.

As illustrated in FIGS. 18 and 19, fan module 370 may have a rectangular exterior. Additionally, as the fan module 370 is provided therein with a circular mixed flow fan module, a small-sized upward discharge-type air purifier, which ensures maximized hydrodynamic performance, may be provided. The fan module 370 according to this embodiment may include a fan housing 380, fan 90, and a fan base 430.

The fan housing 380 may have various exteriors within the technical scope in which the exterior of the fan housing 380 includes a rectangular edge. The fan housing 380 according to an embodiment may include at least one of a support plate 381, a connecting and supporting portion 382, a wire guide 383, a lateral surface supporter 384, an inner guide 385, or a protruding boss 386.

The support plate 381 may be formed into a circular plate and provided with a hole at a center thereof. A motor may be disposed at the center of the support plate 381, or a shaft connected to the motor may be disposed in the first direction.

The connecting and supporting portion 382 may extend outside of the support plate 381 and connect to the lateral surface supporter 384. A plurality of connecting and supporting portions 382 according to an embodiment may be provided and formed into a rod. The connecting and supporting portion 382, extending outside of the support plate 381 in a radial direction of the support plate, may connect to the lateral surface supporter 384.

The wire guide 383 and the connecting and supporting portion 382 may be disposed one after another, and the wire guide 383 may support a lower portion of electric wire 600 of an electronic device, such that the electric wire 600 moves along a lateral surface of the connecting and supporting portion 382. The wire guide 383 may be formed into a projection that is disposed on a lower side of the lateral surface of the connecting and supporting portion 382 and may guide electric wire 600 of a motor disposed on the support plate 381 in such a way that the electric wire 600 extends and is disposed outside of the fan housing 380. The wire guide 383 may form a concave groove which is disposed on the lateral surface of the connecting and supporting portion 382 and in which the electric wire 600 is installed. Accordingly, the electric wire 600 installed in the wire guide 383 may be disposed in the concave groove on the lateral surface of the connecting and supporting portion 382, and its lower portion may be supported by the wire guide 383, thereby preventing the electric wire 600 from being damaged. The lateral surface supporter 384 may be formed into a rectangular frame and have upper and lower sides that are open. An outside of the lateral surface supporter 384 may be formed into a rectangular frame, and an inside of the lateral surface supporter 384 may form a passage through which air moves and form an inner space having a rectangular or circular shape.

The inner guide 385 may form an inclined surface that is disposed downward at a slant from a lower side of the lateral surface supporter 384 toward the inside of the lateral surface supporter in a radial direction of the lateral surface supporter 384. The inner guide 385 may be formed inside of the lateral surface supporter 384 and may prevent air, blown upward by the fan 90, from moving to an entrance of the fan 90 through an outer surface of the fan 90, that is, prevent whirling.

The protruding boss 386 may extend to a lower end of the lateral surface supporter 384, and may be modified in various ways within the technical scope in which the protruding boss 386 is provided with a groove into which coupling projection 134 of fan base 430 described hereinafter is inserted. A plurality of protruding bosses 386 according to an embodiment may be disposed at each edge of the lateral surface supporter 384.

A mixed flow fan may be used as the fan 90. Description in relation to this is provided herein.

Rectangular fan base 430 may be coupled to a lower side of a rectangular fan housing 380 and may be modified in various ways within the technical scope in which the fan base 430 guides air having passed though the filter 40 into the fan 90. A shape of the edge of the fan base 430 may correspond to a shape of the edge of the fan housing 380. For example, when the fan housing 380 has a rectangular shape, the fan base 430 may be formed in a rectangular plate provided with a hole.

A base plate 431 may have a rectangular plate shape and be provided with a hole for allowing air to move at a center thereof. A bell mouth 432 may be installed in an annular shape on the base plate 431. The bell mouth 432 may have a longitudinal cross-section that is concave and encircles a lower side of inlet projection 121 of shroud 120 and may extend in the circumferential direction. The bell mouth 432 may be formed in such a way that the bell mouth 432 encircles an outer circumferential surface of the hole formed at a center of the base plate 431. The bell mouth 432 may form a groove that is convex downward and concave upward.

A coupling projection 434 may protrude from the base plate 431 upward and be fitted-coupled to the groove of the protruding boss 386 of the fan housing 380 to fix the fan base 430 to the lower side of the fan housing 380. As a result of the coupling between the coupling projection 434 and the protruding boss 386, the fan base 430 and the fan housing 380 may be coupled at a plurality of positions. When the fan base 430 and the fan housing 380 are coupled as described above, the fan 90 may be installed between the fan base 430 and the fan housing 380 in a rotatable manner.

Figure 3:
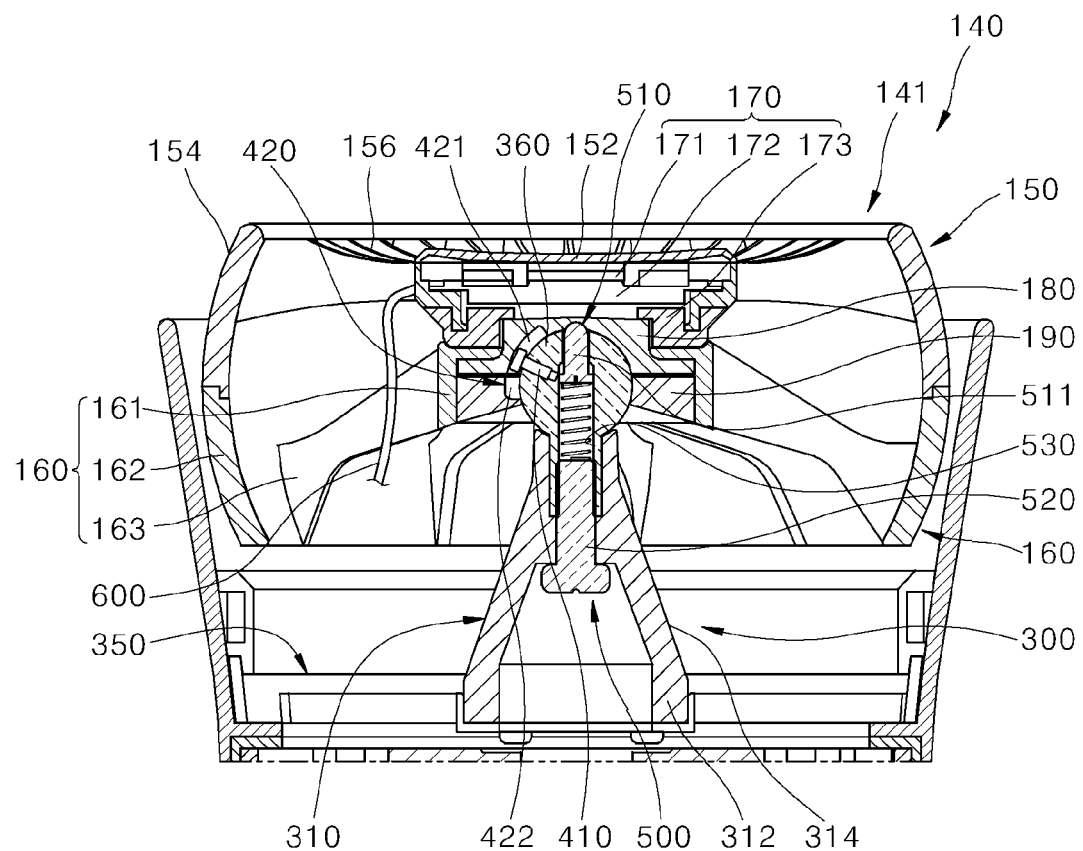
FIG. 3 is a cross-sectional view showing a discharge according to an embodiment connected to a rotational guide.
Figure 4:
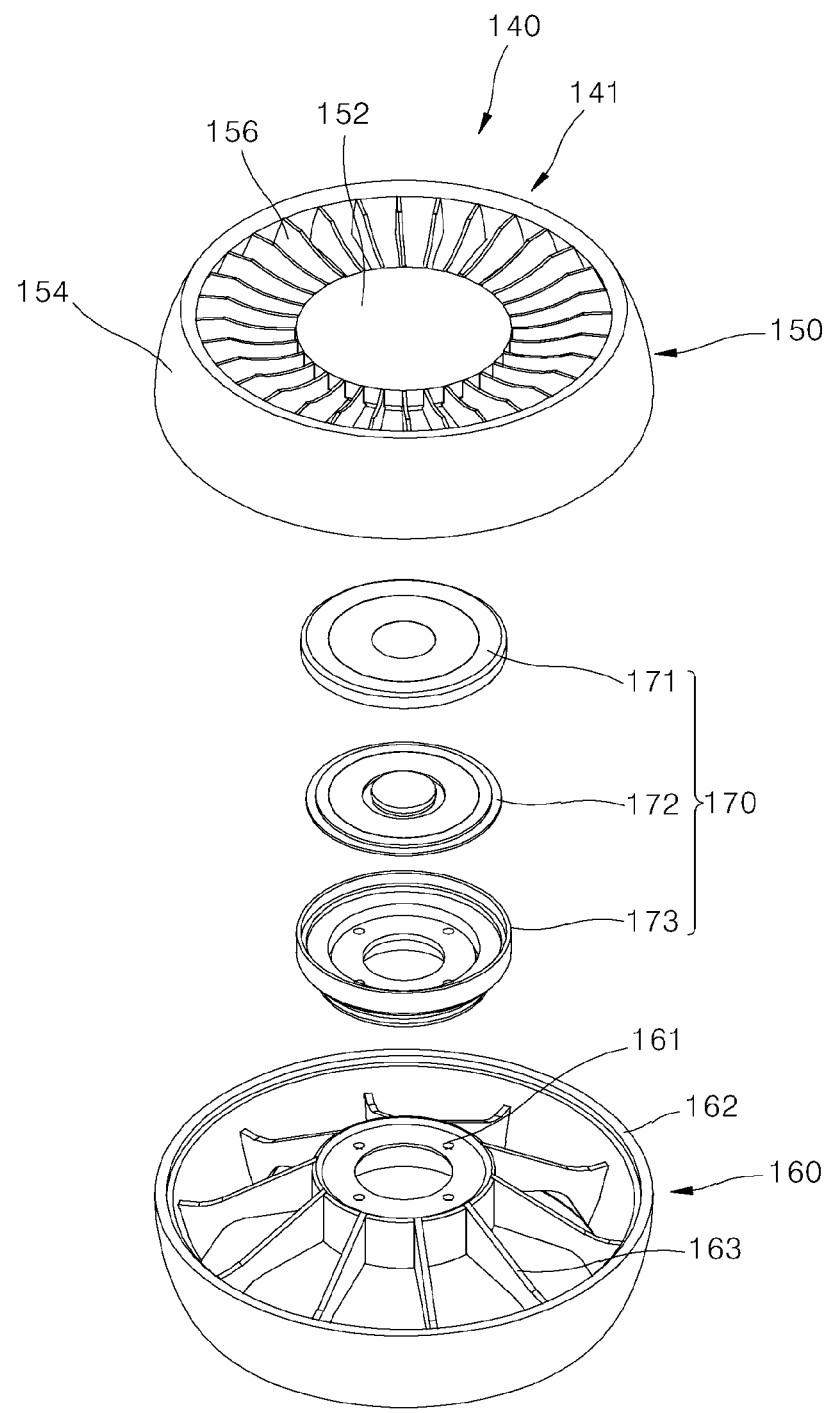
FIG. 4 is an exploded perspective view of the discharge of FIG. 3.
Figure 5:
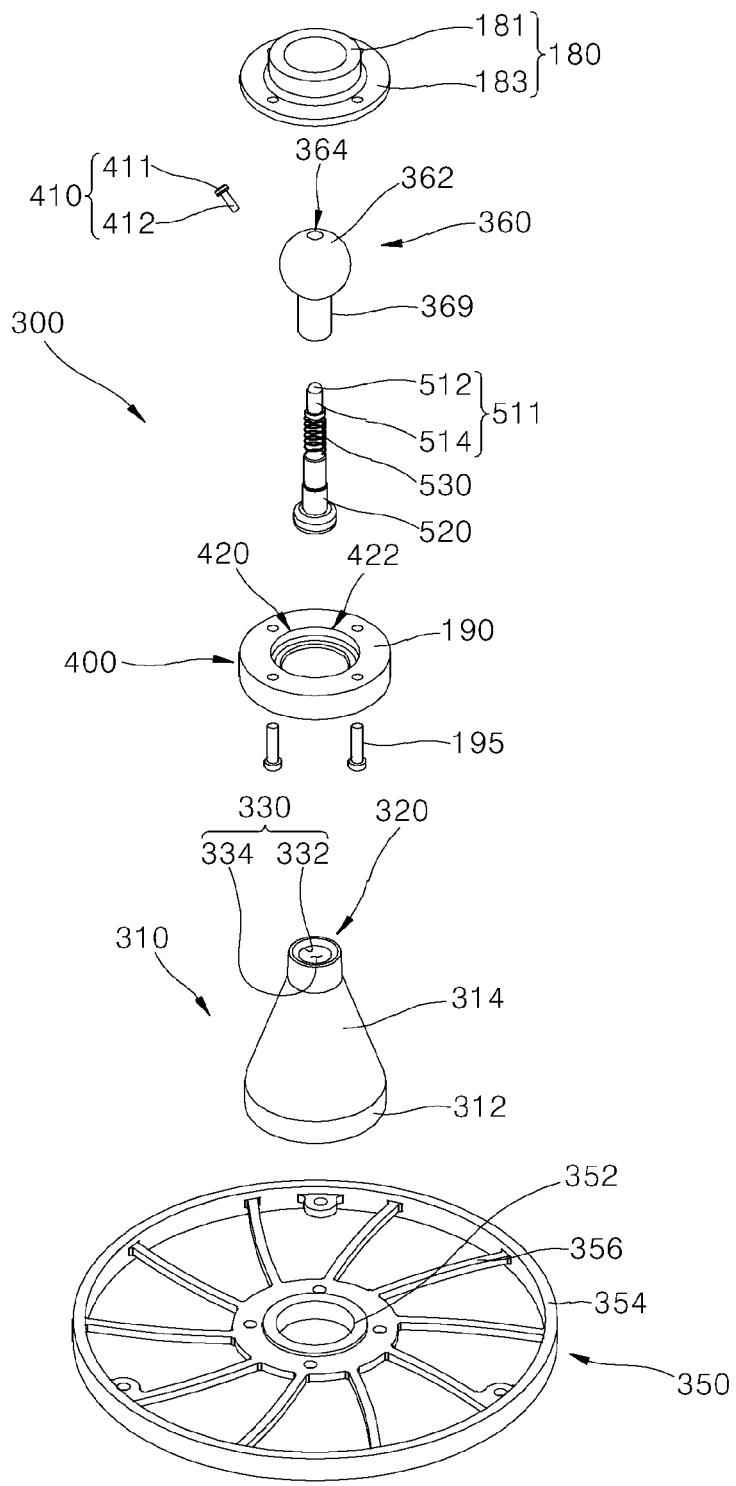
FIG. 5 is an exploded perspective view of a rotational guide according to an embodiment.
Figure 6:
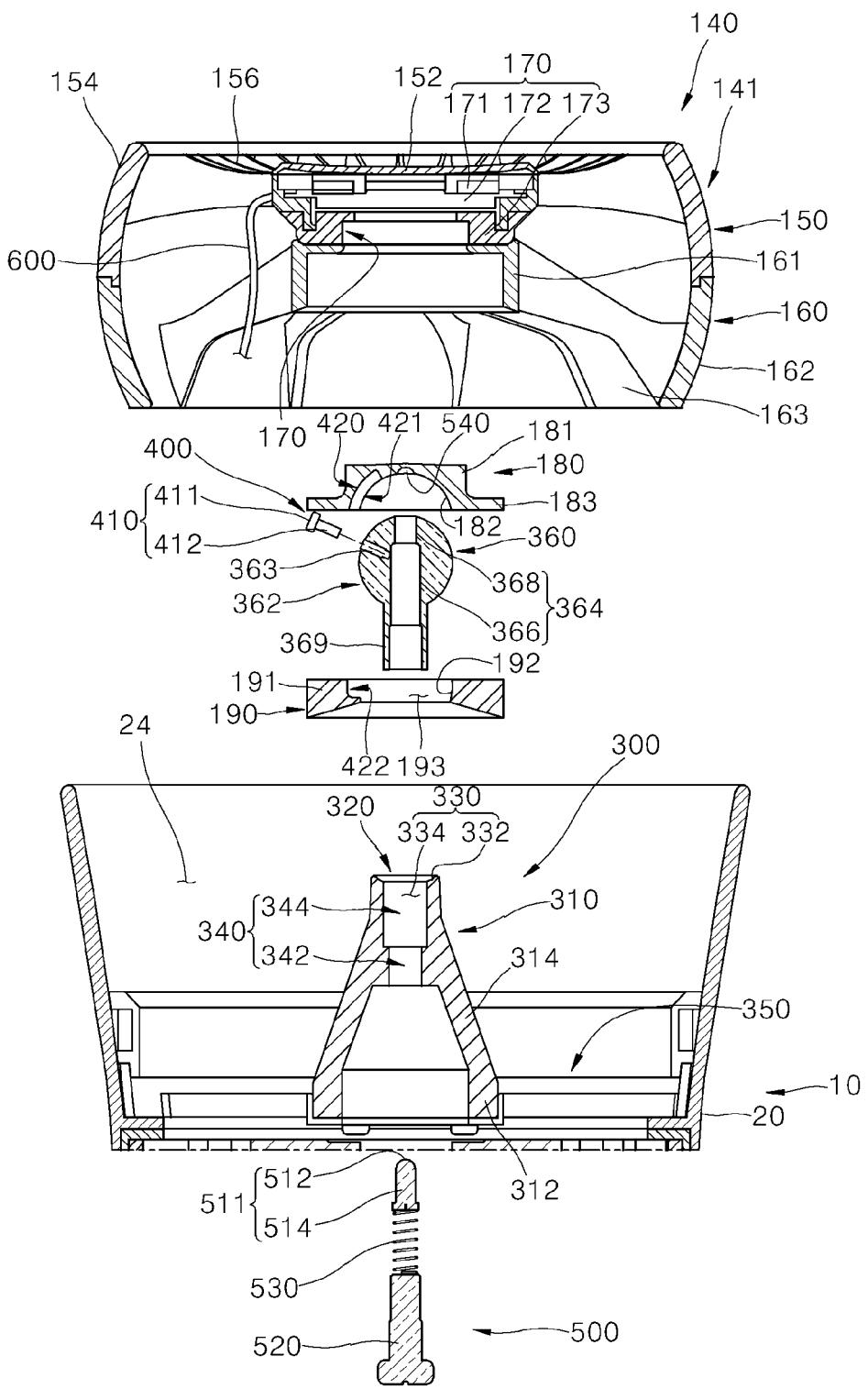
FIG. 6 is an exploded cross-sectional view showing the discharge of FIG. 3 separated from a rotational supporter.

FIG. 3 is a cross-sectional view showing a discharge according to an embodiment connected to a rotational guide. FIG. 4 is an exploded perspective view of the discharge of FIG. 3 according to an embodiment. FIG. 5 is an exploded perspective view of a rotational guide according to an embodiment. FIG. 6 is an exploded cross-sectional view showing the discharge of FIG. 3 separated from a rotational supporter.

As illustrated in FIGS. 3 to 6, the discharge 140 may be disposed at outlet 24 of housing 10, may be installed in rotational supporter 300 in a rotatable manner, and may be modified in various ways within the technical scope in which the discharge 140 guides a discharge direction of air having passed through fan module 70. The discharge 140 according to embodiments may be installed in sphere-shaped ball joint 360 included in the rotational supporter 300 in a rotatable manner and may smoothly rotate.

The discharge 140 disposed on an upper side of the housing 10 may be open in the vertical direction and connected to the rotational supporter 300 in a rotatable manner such that a discharge direction of air having passed through the fan module 70 may be adjusted. The discharge 140 according to an embodiment may include a discharge body 141, a first supporter 180, and a second supporter 190.

The discharge body 141 may be disposed at the outlet 24 of the housing 10 and may guide a discharge direction of air. The discharge body 141 according to an embodiment may include a first discharge 150, a second discharge 160, and a core mount 170.

The first discharge 150 may be disposed on one side (an upper side in FIG. 3) of the ball joint 360, and may be modified in various ways within the technical scope in which the first discharge 150 is provided with a plurality of vanes 156 that guides discharge of air. The first discharge 150 according to an embodiment may include a first discharge core 152, a first discharge body 154, and vane 156.

The first discharge core 152 may be disposed on an upper side of the ball joint 360 and may have various shapes including a circular plate shape. The first discharge body 154 may be spaced from the first discharge core 152 and disposed in a ring shape that encircles an outside of the first discharge core 152. An outside of the first discharge body 154 may be formed into a curved surface and installed in a state of being spaced from the housing 10. Accordingly, the first discharge body 154 may be prevented from contacting the housing 10 when the first discharge 150 rotates. As the first discharge core 152 and the first discharge body 154 are connected by the plurality of vanes 156, the first discharge core 152, the first discharge body 154, and the vane 156 may rotate together.

The second discharge 160 may be disposed on the other side (a lower side in FIG. 3) of the ball joint 360, may connect to the first discharge 150 and may be modified in various ways within the technical scope in which the second discharge 160 rotates around the ball joint 360 together with the first discharge 150. The second discharge 160 according to an embodiment may include a second discharge core 161, a second discharge body 162, and a discharge core supporter 163.

The second discharge core 161 may be coupled to the first discharge core 152 with the core mount 170 between the second discharge core 161 and the first discharge core 152. The second discharge core 161 may form a groove which is concave downward, and the first supporter 180 and the second supporter 190, which encircle the ball joint 360, may be disposed inside of the second discharge core 161.

The second discharge body 162 may be spaced from the second discharge core 161 and formed in a ring shape that encircles an outside of the second discharge core 161. An outside of the second discharge body 162 may be formed into a curved surface and be installed in a state of being spaced from the housing 10. Accordingly, the second discharge body 162 may be prevented from contacting the housing 10 when the second discharge 160 rotates. As the second discharge core 161 and the second discharge body 162 are connected by the plurality of discharge core supporters 163, the second discharge core 161, the second discharge body 162, and the discharge core supporter 163 may rotate together.

The core mount 170 may be disposed between the first discharge 150 and the second discharge 160, and may receive a manipulation signal through the first discharge 150 or display an operation state of the portable air purifier 1 through the first discharge 150. The core mount 170 according to an embodiment may include a touch panel 171 disposed on a lower side of the first discharge core 152 and configured to receive a user's manipulation signal through the first discharge core 152, a display 172 disposed on a lower side of the touch panel 171, configured to provide image information toward the first discharge core 152 and including a printed circuit board (PCB) configured to receive the manipulation signal of the touch panel 171, and a fixing case 173 fixed to the first discharge 150 while encircling the touch panel 171 and the display 172.

The first supporter 180 may connect to the discharge body 141, or the first supporter 180 and the discharge body 141 may be integrally formed, and the first supporter 180 may be modified in various ways within the technical scope in which the first supporter 180 is provided with a first curved groove 182 formed into a concave groove. The first curved groove 182 may be installed in a way that the first curved groove 182 encircles the upper side of the ball joint 360 having a sphere shape. The first supporter 180 according to an embodiment may include a first support body 181 and a first wing 183.

The first support body 181 may be disposed inside of the first curved groove 182 in the form of a concave groove and fixed to a center of the discharge body 141. The first support body 181 according to an embodiment may be coupled to a lower side of the second discharge 160. The first support body 181 may be inserted into a lower side of the second discharge core 161 of the second discharge 160 and fixed to an inside of the second discharge core 161.

The first wing 183 may extend outside of or radially outward from the first support body 181 and face the second supporter 190. The first wing 183 and the second supporter 190 may be fixed by a fastening member 195 and may be coupled with a gap therebetween.

The first wing 183 may be in the form of a plate that extends along a circular arc, and the first support body 181 may have a cylindrical shape that protrudes upward from a central portion of the first wing 183, may be provided therein with the first curved groove 182 and may have a lower side that is open.

The second supporter 190 may be coupled to the first supporter 180, and may be provided with a second curved groove 192 connected to the first curved groove 182 on an inner side thereof. The second curved groove 192 may be installed in such a way that the second curved groove 192 encircles a lateral surface and a portion of a lower side of the ball joint 360 having a sphere shape.

The second supporter 190 according to an embodiment may be provided with a hole 193 that communicates in the vertical direction and may include a second support body 191 installed in the circumferential direction. The second curved groove 192 may be formed inside of the second support body 191 facing the hole 193.

An upper side of the discharge 140 may be placed in the horizontal direction, and a position at which air having passed through the discharge 140 is moved upward may be set to an initial position of the discharge 140. When the discharge 140 is at the initial position, an inner diameter of a lower end of the second curved groove 192 may be less than a maximum outer diameter of the ball joint 360. The second supporter 190 surrounding the lower side of the ball joint 360 may be fixed to the first supporter 180 surrounding the upper side of the ball joint 360. Accordingly, it is possible to prevent the ball joint 360 from being separated to the outside of the second supporter 190.

Figure 21:
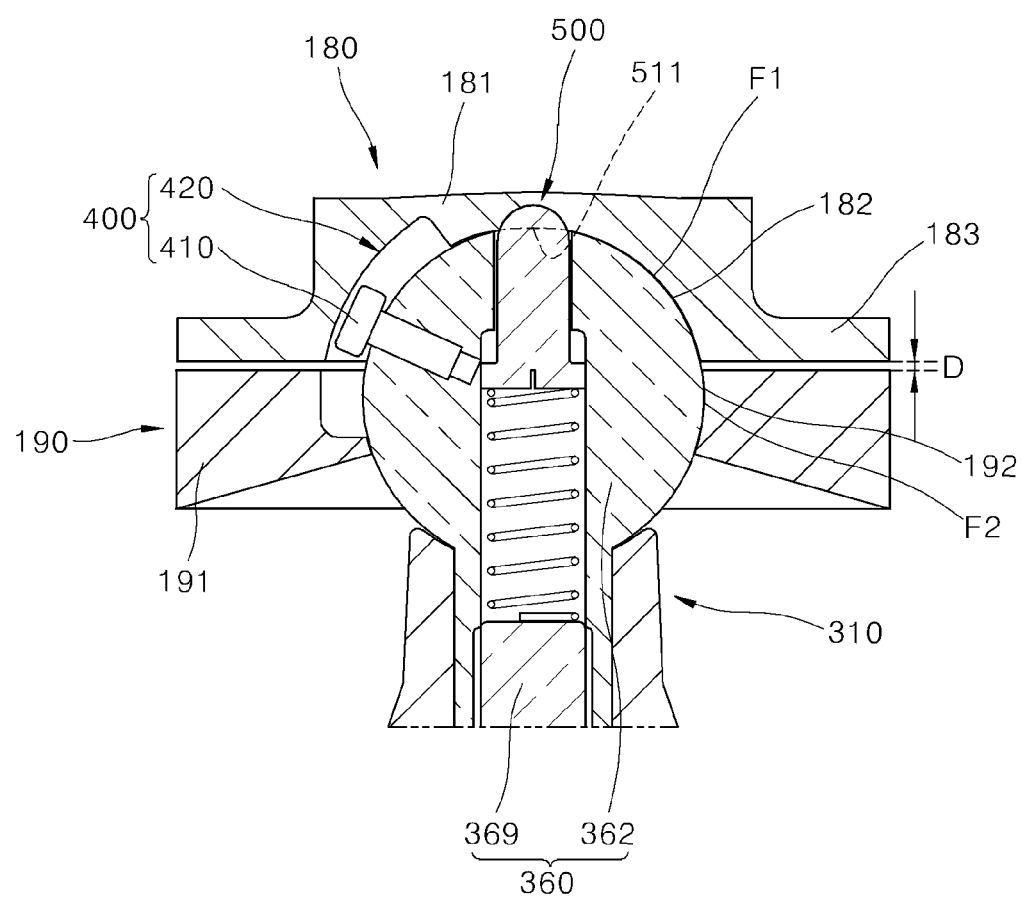
FIG. 21 is a view showing a ball joint installed between a first supporter and a second supporter according to an embodiment.

As illustrated in FIG. 21, a frictional force between the first supporter 180 and the ball joint 360 may be referred to as F1, and a frictional force between the second supporter 190 and the ball joint 360 may be referred to as F2. Additionally, when a distance between the first supporter 180 and the second supporter 190 is D, F1 and F2 are inversely proportional to D.

That is, the frictional force between the first supporter 180 and the ball joint 360 and the frictional force between the second supporter 190 and the ball joint 360 may be inversely proportional to the distance between the first supporter 180 and the second supporter 190 which are installed to face each other with the ball joint 360 therebetween. When D increases, F1 and F2 decrease, and when D decreases, F1 and F2 increase.

When the discharge 140 rotates around the ball joint 360 and then does not maintain a state in which the discharge 140 is rotated although the discharge 140 needs to maintain the state, D may decrease as a result of adjustment of a fastening state of the fastening member 195, and accordingly, F1 and F2 may increase. Additionally, when the discharge 140 does not smoothly rotate due to the increase in F1 and F2, the fastening member 195 may be adjusted to increase D, and accordingly, F1 and F2 may decrease. When a direction of rotation of the discharge 140 is adjusted manually, the discharge 140 may rotate readily, and the discharge 140 may be prevented from rocking after completion of its rotation, thereby improving reliability in operation of the discharge 140.

As illustrated in FIG. 6, the first supporter 180 may be provided with the first curved groove 182 in the form of a downwardly concave groove, and the second supporter 190 may be provided with the second curved groove 192 that forms a groove concave along an inner circumference of the second support body 191 facing the hole 193. When the discharge 140 is at an initial position, the upper side of the ball joint 360 may be inserted into the first curved groove 182, and the second curved groove 192 may be installed to encircle a portion of the lateral surface and a portion of a lower portion of the ball joint 360. Accordingly, the first supporter 180 and the second supporter 190 may rotate around the ball joint 360.

The second supporter 190 may be fixed to the first supporter 180 by the fastening member 195, and the first supporter 180 may be fixed to the discharge body 141. Thus, the discharge body 141, the first supporter 180, and the second supporter 190 may form a single module and rotate around the ball joint 360.

As illustrated in FIG. 2, the sterilizer 200 may be disposed between the filter 40 and the second case 30, and may be modified in various ways within the technical scope in which the sterilizer 200 emits light rays for sterilization to the filter 40. The sterilizer 200 according to an embodiment may include at least one of a sterilizing and supporting portion 210, a support 220, and an emitter 230.

The sterilizing and supporting portion 210 may be disposed between the first case 20 and the second case 30 and may shield the lower portion of the first case 20. The sterilizing and supporting portion 210 may be disposed on a lower side of the emitter 230, and may be modified in various ways within the technical scope in which the sterilizing and supporting portion 210 connects to the housing 10 and movement of the sterilizing and supporting portion 210 is restricted.

Air introduced into the first case 20 through the inlet 22 may be prevented from moving to the second case 30 by the sterilizing and supporting portion 210. Accordingly, a flow rate of air moving to the fan module 70 may increase and an air purification performance of the portable air purifier 1 may improve.

The support 220 may be modified in various ways within the technical scope in which the support 220 protrudes from a center of the sterilizing and supporting portion 210 upward and supports a lower portion of the emitter 230. The support 220 may be disposed at a center of the inlet 22 in a radial direction of the inlet and a transverse cross-section of the support 220 may have a circular shape to reduce friction with air.

The support 220 may be in the form of a pillar that protrudes from the center of the sterilizing and supporting portion 210 upward. The support 220 may be formed into a cylinder or a circular cone. The support 220 according to an embodiment may have a transverse cross-section which is narrowed gradually from a lower side to an upper side and may be disposed at a center of the first case 20 provided with the inlet 22, thereby minimizing friction with air.

A transverse cross-section of the sterilizing and supporting portion 210 that sterilizes the filter 40 may have a circular shape, and air suctioned through the inlet 22 may rotate outside the support 220 while rotating in a spiral shape thanks to an inclined shape of the inlet hole 23 and may move to the upper side on which the filter 40 is disposed. That is, the sterilizer 200 may be disposed in a central portion of the first case 20 and air suctioned through the inlet 22 may move upward while rotating around an outer circumference of the sterilizer 200, thereby reducing flow resistance of the sterilizer 200. As rotational centers of the support 220 and the fan 90, and core 310 of rotational supporter 300 described hereinafter are disposed on a same straight line, resistance against a flow of air moving from the lower side to the upper side may decrease, and air may flow more smoothly, thereby ensuring improvement in air purification performance of the portable air purifier 1.

The emitter 230 may be disposed on an upper side of the support 220 and may emit a light ray for sterilization toward the filter 140. The emitter 230 may be disposed on a reference line that vertically passes through the center of the inlet 22 in a radial direction of the inlet 22. When the filter 40 is disposed on an upper side of the emitter 230, an entire surface area of a lower end of the filter 40 may be sterilized by a relatively small number of sterilizing light sources 232, thereby reducing costs incurred for manufacturing, maintenance, and repair.

The emitter 230 may be modified in various ways within the technical scope in which the emitter 230 is disposed at a position higher than or the same as a position of an upper end of the inlet 22. The emitter 230 according to an embodiment may include printed circuit board (PCB) 231 and sterilizing light source 232. The PCB 231 may be disposed on the upper side of the support 220, and the sterilizing light source 232 that emits light rays for sterilization may be disposed on an upper side of the PCB 231. The sterilizing light source 232 may be, for example, an ultraviolet light emitting diode (UVC LED); however, various types of sterilizing devices may be used within the technical scope in which the sterilizing light source 232 sterilizes germs in the filter 40. As the sterilizing light source 232 of the sterilizer 200 is disposed on an upper side of the inlet 22, the sterilizing light source 232 may be prevented from emitting out of the first case 20 through the inlet 22.

Figure 7:
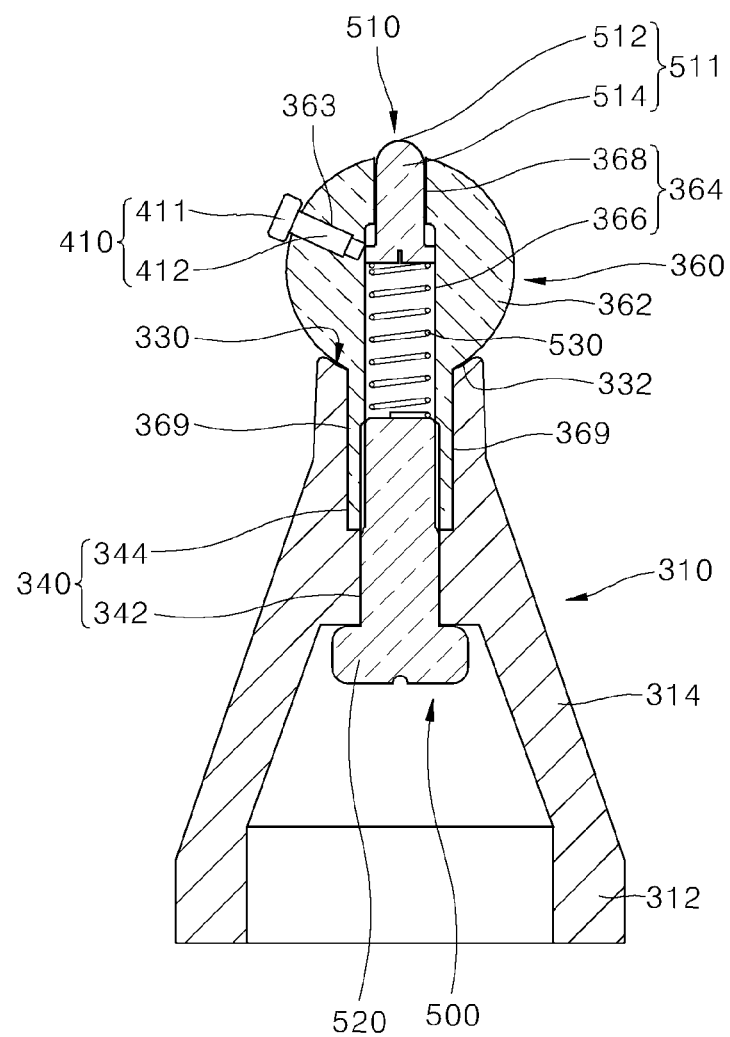
FIG. 7 is a cross-sectional view of a rotational supporter according to an embodiment.
Figure 20:
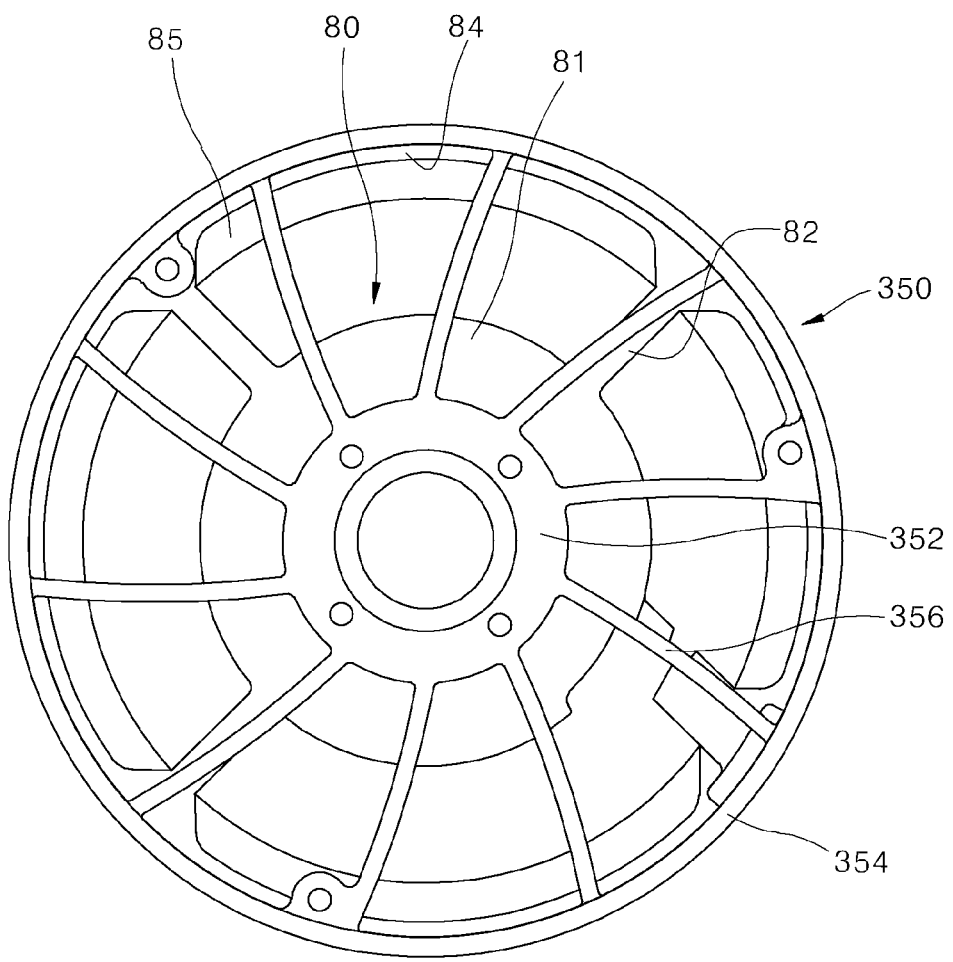
FIG. 20 is a plan view of a core supporter according to an embodiment.

FIG. 7 is a cross-sectional view of a rotational supporter according to an embodiment. FIG. 8 is a perspective view of the discharge and the rotational supporter according to an embodiment. FIG. 20 is a plan view of a core supporter according to an embodiment.

As illustrated in FIGS. 6 to 8 and 20, the rotational supporter 300 may connect to the housing 10 and support the discharge 140 disposed at the outlet 24 of the housing 10 in a rotatable manner, and movement of the rotational supporter 300 may be restricted. One or a first side of the rotational supporter 300 may connect to the housing 10, and the other or a second side may be disposed at a position facing the first curved groove 182 and the second curved groove 192. The rotational supporter 300 may support the first supporter 180 and the second supporter 190 in a rotatable manner. The rotational supporter 300 according to an embodiment may include core 310, core supporter 350, and ball joint 360.

The core 310 may be disposed on a lower side of the discharge 140 configured to adjust a discharge direction of air and may extend from a center of the outlet 24 to the discharge 140. The core 310 may be disposed on a lower side of the second supporter 190, may extend from the center of the outlet 24 to the second supporter 190, and may support the ball joint 360. Additionally, the core 310 may have an outside formed into a curved surface and a transverse cross-section which is gradually reduced from a lower side connected to the core supporter 350 toward the ball joint 360, thereby minimizing resistance of air moving from the lower side to the upper side.

The core 310 may be formed into a circular cone shape and may have a transverse cross-section which is gradually reduced toward the upper side. The core 310 according to an embodiment may include a core base 312, a core body 314, and a core connector 320. The core base 312 may form a lower portion of the core 310 and may be fixed to the core supporter 350. The core base 312 may be disposed in a central portion of the housing 10 and formed into a pipe that extends in the vertical direction.

The core body 314 may extend to an upper side of the core base 312 and may be formed into a circular cone having upper and lower sides that are open. The core connector 320 may be modified in various ways within the technical scope in which the core connector 320 forms a space for installing a position informing portion 500 and a space that connects the ball joint 360 inside of the core body 314. The core connector 320 according to an embodiment may include a joint seat 330 and an inner fastener and support 340.

The joint seat 330 may form a space for coupling the core body 314 and the ball joint 360 through an upper side of the core body 314. The joint seat 314 according to an embodiment may include a curved surface supporter 332 forming a surface which is concavely curved to allow an outside of the ball joint 360 to be seated on the upper side of the core body 314 facing the ball joint 360, and a joint connecting hole 334 forming a hole for allowing the ball joint 360 to be disposed at an upper end of the core body 314.

The inner fastener and support 340 may extend to an inside of the core body 314, and may be modified in various ways within the technical scope in which the inner fastener and support 340 supports the ball joint 360 and a first adjusting bolt 520 of the position informing portion 500. The inner fastener and support 340 according to an embodiment may include a first fastener and support 342 that extends to the inside of the core body 314 and forms a hole through which a body of the first adjusting bolt 520 passes, and a second fastener and support 344 that is disposed on an upper side of the first fastener and support 342 and encircles an outside of a mounting projection 369 extending to the lower side of the ball joint 360.

The core supporter 350 may extend outside of the core 310 and may be fixed to the inside of the housing 10, and may be modified in various ways within the technical scope in which movement of the core supporter 350 is restricted together with movement of the core 310. The core supporter 350 according to an embodiment may include a first core supporter 352, a second core supporter 354, and a connecter 356.

The first core supporter 352 may be coupled to the lower portion of the core 310 and may be installed in a ring shape. The core base 312 may be coupled to an inside of the first core supporter 352, and the second core supporter 354 having a ring shape is installed outside of the first core supporter 354. Movement of the second core supporter 354 may be restricted using various fixing methods, such as a method by which the second core supporter 354 is fixed to the housing 10 based on fitting or using a bolt, for example.

The first core supporter 352 and the second core supporter 354 may be connected by the connecter 356. The connecter 356 may be installed spirally or radially with respect to the first core supporter 352. As the first core supporter 352 according to an embodiment is installed spirally along a direction of airflow discharged from the fan module 70, frictional resistance between the connecter 356 and air may decrease.

The ball joint 360 may be coupled to the core 310, and may be modified in various ways within the technical scope in which the ball joint 360 supports the discharge 140 in a rotatable manner. A lower side of the ball joint 360 may be coupled to the core 310, and movement of the ball joint 360 may be restricted. An upper side of the ball joint 360 may be inserted into the discharge 140 and may support the discharge 140 in a rotatable manner. The upper side of the ball joint 360 according to an embodiment may be disposed inside of the first curved groove 182 and the second curved groove 192 and may support the first supporter 180 and the second supporter 190 in a rotatable manner.

The ball joint 360 may be formed into a sphere disposed inside of a sphere-shaped groove formed by the first curved groove 182 and the second curved groove 192. An outer diameter of the ball joint 360 may be greater than the inner diameter of the lower end of the second curved groove 192. Accordingly, the ball joint 360 may be prevented from escaping out of the second supporter 190.

An end of the ball joint 360 may have a sphere shape, may be disposed inside the discharge 140 and may support the discharge 140 in a rotatable manner. The upper side of the ball joint 360 may have a sphere shape, and a mounting projection 369 formed into a bar that extends from the sphere-shaped upper side to the lower side may be inserted into and fixed to the core 310 through a joint connecting hole 334 disposed on an upper side of the core 310. The ball joint 360 and the core 310 may be fixed using various fixing methods, such as screw coupling, pin coupling or using an adhesive, for example.

The ball joint 360 according to an embodiment may include a joint body 362 and a mounting projection 369. The joint body 362 may be formed into a sphere and may be provided therein with a first mounting hole 363 and a second mounting hole 364. The first mounting hole 363 may form a groove for fastening the guide projection 410 of the rotational guide 400 outside of the joint body 362.

The second mounting hole 364 spaced from the first mounting hole 363 may form a hole that passes through the joint body 362 in the vertical direction. The second mounting hole 364 may be disposed at a center of the joint body 362 and may form a hole for installing an informing projection 510 of the position informing portion 500. The second mounting hole 364 according to an embodiment may include a small diameter hole 368 that extends from an upper end of the ball joint 360 to an inside of the ball joint 360, and a large diameter hole 366 that communicates with a lower side of the small diameter hole 368 and extends downward. An inner diameter of the large diameter hole 366 may be greater than an inner diameter of the small diameter hole 368. Accordingly, a moving head 512 of a movable projection 511 of the position informing portion 500 may be disposed inside of the large diameter hole 366, and the moving head 512 of the movable projection 511 may protrude from the ball joint 360 upward through the small diameter hole 368.

The mounting projection 369 may be in the form of a pipe that extends to a lower side of the joint body 362 and may be provided therein with an inner elastic member 530 of the position informing portion 500. The mounting projection 369 may be inserted into the core 310 through the joint connecting hole 334 and disposed inside the second fastener and support 344. The mounting projection 369 may be disposed inside of the second fastener and support 344 simply in a state of being inserted into the second fastener and support 344, and as the mounting projection 369 is provided therein with a screw thread, the first adjusting bolt 520 may be fastened to an inside of the mounting projection 369. Alternatively, an outside of the mounting projection 369 and an inside of the second fastener and support 344 may have a screw thread such that the mounting projection 369 is fastened to the second fastener and support 344.

The rotational guide 400 may be respectively installed in the discharge 140 and the rotational supporter 300, and may be modified in various ways within the technical scope in which the rotational guide 400 guides rotation of the discharge 140 such that the discharge 140 rotates at predetermined angles. The rotational guide 400 according to an embodiment may include a guide projection 410 and a guide groove 420.

The guide projection 410 may connect to the ball joint 360 or the guide projection 410 and the ball joint 360 may be integrally formed. The guide projection 410 may be formed into a projection that protrudes outside of the ball joint 360. The guide projection 410 according to an embodiment may be in the form of a bolt and may include a held head 411 held outside the ball joint 360 and a fastened body 412 that extends from the held head 411 and fastened to the inside of the ball joint 360. The fastened body 412 may be fastened to the first mounting hole 363.

The guide groove 420 may be modified in various ways within the technical scope in which the guide groove 420 is provided with a concave groove inside of the discharge 140 facing the guide projection 410. The guide groove 420 according to an embodiment may be installed in at least one of the first supporter 180 or the second supporter 190 facing the ball joint 360. Alternatively, the guide groove 420 may be formed respectively in the first supporter 180 and the second supporter 190. A first groove 421 may be formed inside of the first supporter 180 disposed on a path in which the guide projection 410 moves, and a second groove 422 may be formed inside of the second supporter 190.

When a predetermined rotational angle of the discharge 140 is 30 degrees, an angle between one or a first end and the other or a second end of the guide groove 420 may be 30 degrees with respect to the center of the joint body 362. If the rotational angle of the discharge 140 changes, the angle between the first end and the second end of the guide groove 420 may also change with respect to the center of the joint body 362. Accordingly, the guide projection 410 may be inserted into the guide groove 420 and may be held in the guide groove 420 such that rotation of the discharge 140 at the predetermined rotational angle or greater is restricted.

The position informing portion 500 may be modified in various ways within the technical scope in which the position informing portion 500 is held in the discharge 140 and provides a sense of manipulation when the discharge 140 is at a predetermined position. The predetermined position of the discharge 140 may be set to an initial position at which air having passed through the discharge 140 is discharged upward; however, embodiments are not limited thereto. The predetermined position of the discharge 140 may be set to various rotational positions of the discharge 140.

The position informing portion 500 according to an embodiment may include informing projection 510 and informing groove 540. The informing projection 510 may be provided with a movable projection 511 which is pressed by an elastic force toward the outside of the ball joint 360, and may be modified in various ways within the technical scope in which the movable projection 511 protrudes outside the ball joint 360 when the discharge 140 is at the predetermined position. The informing projection 510 according to an embodiment may include movable projection 511, first adjusting bolt 520, and inner elastic member 530.

The movable projection 511 may move along the second mounting hole 364 of the joint body 362 in the vertical direction. The movable projection 511 according to an embodiment may be in the form of a bolt and may include moving head 512 and moving body 514. The moving head 512 may be disposed inside of the large diameter hole 366, and upward movement of the moving head 512 may be restricted as the moving head is held by a step disposed between the large diameter hole 366 and the small diameter hole 368. A convexly curved surface may be formed at an upper end of the moving body 514 that extends from the moving head 512 upward.

The first adjusting bolt 520 may be fastened to the first fastener and support 342 of the core 310. The first adjusting bolt 520 may be fastened to the large diameter hole 366 disposed inside of the joint body 362. Alternatively, the first adjusting bolt 520 may not be fastened to an inside of the first fastener and support 342 while being fastened to the screw thread included inside of the large diameter hole 366.

A lower side of the inner elastic member 530 may be supported by the first adjusting bolt 520 and an upper side may support the movable projection 511. A coil spring may be used as the inner elastic member 530 according to an embodiment, and the movable projection 511 may be pressed by elasticity.

The informing groove 540 may be modified in various ways within the technical scope in which the informing groove 540 forms a groove into which the movable projection 511 is inserted and held, in the discharge 140 facing the informing projection 510. The informing groove 540 according to an embodiment may be formed in the first supporter 180. The informing groove 540 having a concave shape may be formed on a lower side of the first support body 181, and when the discharge 140 is at the initial position, the informing groove 540 may be at a position facing the movable projection 511. Accordingly, the movable projection 511 may be inserted into the informing groove 540 and may provide a sense of manipulation to a user.

The inlet 22 through which external air may be suctioned may be disposed along the outer circumference of the first case 20. Accordingly, external air outside of the first case 20 may move into the first case 20 through the inlet 22 and a flow rate of suctioned air may increase.

As a result of operation of the fan module 70, air outside of the portable air purifier 1 may be suctioned into the portable air purifier 1. In this case, the air outside of the portable air purifier 1 may form an air flow rotating along an outer circumference of the sterilizing and supporting portion 210 in a spiral shape while passing through the inlet hole 23 inclined.

The air, which is suctioned into the first case 20 and moves upward while rotating in a spiral shape, may pass through the filter 40, and in this process, physical particles, such as dust/fine dust/ultra-fine dust, chemical substances, such as odor particles/harmful gases, and microorganisms, such as bacteria and viruses, which are included in the air, may be filtered. As the filter 40 and the fan module 70 are disposed on the same straight line in the vertical direction, flow loss may be minimized and air may be suctioned and filtered effectively.

The air having passed through the filter 40, that is, purified air, may be introduced into the fan module 70. A flow of the air may be guided by the bell mouth 132, and accordingly, the air may be introduced into the fan module 70 effectively and smoothly.

The air introduced into the fan module 70 may be discharged from an upper side of the fan module 70. The air discharged from the upper side of the fan module 70 may be discharged in a mixed flow direction. The mixed flow direction may be defined as an upward diagonal direction.

The air introduced into a central portion on a lower side of the fan module 70 may move upward through a discharge opening provided along an inside of an edge of the fan module 70 in a ring shape. That is, the air introduced into a lower portion of the fan module 70 may be discharged in the upward diagonal direction such that a passage for movement of air and a direction of a flow path of air of the rotational supporter 300 are matched, as a mixed flow fan is applied as the fan module 70, thereby reducing flow loss.

The air discharged from the upper side of the fan module 70, that is, purified air, may be introduced into the discharge 140 from the lower side thereof and may be discharged from the upper side of the discharge 140. The discharge 140 may rotate within a range of predetermined angles. Accordingly, a direction of the discharged air may be adjusted depending on an angle at which the discharge 140 is positioned.

Additionally, an inside of the discharge 140 may form a concave groove. Accordingly, an increase in discharge resistance of air, a direction of which is changed by the discharge 140, may be suppressed. Further, as the filter 140, the fan module 70, and the discharge 140 are disposed on the same straight line in the vertical direction, flow loss of air may be minimized, air may be suctioned effectively, and filtered and purified air may be discharged effectively.

As the sphere-shaped ball joint 360 is disposed inside of the first supporter 180 and the second supporter 190 of the discharge 140, the discharge 140 may rotate around the ball joint 360. The discharge 140 may be rotatably installed in the ball joint 360 included in the rotational supporter 300. Thus, the discharge 140 may be installed in a way that the discharge 140 rotates around the ball joint 360 such that a discharge direction of air is readily adjusted.

When a rotational angle of the discharge 140 serving as a circulator is 0 degrees, the upper side of the discharge 140 needs to be installed in the horizontal direction, and the informing groove 540 formed in the first supporter 180 of the discharge 140 may face the informing projection 510. Accordingly, the movable projection 511 pressed by the inner elastic member 530 may be held in the informing groove 540, and the user may readily ascertain that the discharge 140 is placed at the right position, that is, an initial position.

The core mount 170 serving as a touch panel may be installed in a central portion of the discharge 140, and electric wire 600 connected to the core mount 170 may connect to a lower side of the housing 10. Accordingly, when a panel makes a 360-degree rotation without additional restrictions on rotation of the panel, the electric wire may be broken or damaged. To prevent this from happening, the rotational guide 400 may be installed to adjust the rotational angle of the discharge 140 within predetermined angles, thereby preventing damage to the electric wire 600.

That is, the discharge 140 may rotate within the predetermined angles, thereby preventing the electric wire 600 connected to the discharge 140 from being broken or damaged, as the guide projection 410 protruding outside the ball joint 360 is held in the guide groove 420 formed inside of the discharge 140. When the discharge 140 rotates at the predetermined angle or greater, the guide projection 410 protruding outside the ball joint 360 may bump against the first supporter 180 and the second supporter 190 disposed at a boundary of the guide groove 420. Thus, the discharge 140 may rotate with the predetermined angles.

Further, as a spring force of the inner elastic member 530 is adjusted by adjusting the position at which the first adjustment bolt 520 is fastened to the mounting protrusion 369, the force of the inner elastic member 530 to press the movable projection 511 is also adjusted.

Embodiments disclosed herein are directed to a portable air purifier in which a discharge that guides discharge of air is installed in a rotatable manner. Embodiments disclosed herein are also directed to a portable air purifier in which a discharge rotates within predetermined angles, thereby preventing damage to an electric wire connected to the discharge.

Advantages according to embodiments disclosed herein are not limited to the ones described, and other advantages not mentioned may be clearly understood from the description and may be more clearly understood from the embodiments set forth herein. Additionally, advantages may be realized via means and combinations thereof that are described in the appended claims.

In a portable air purifier according to embodiments disclosed herein, a discharge may be installed on an upper side of a housing in such a way that the discharge is supported by a rotational supporter in a rotatable manner. More specifically, the discharge may be disposed at a ball joint included in the rotational supporter and may rotate around the ball joint, thereby readily adjusting a discharge direction of air. A rotational angle of the discharge may be limited within the predetermined angles by a rotational guide. More specifically, a guide projection that protrudes outside of the ball joint may be held in a guide groove formed inside of the discharge, and the discharge may rotate within the predetermined angles, thereby preventing an electric wire connected to the discharge from being broken or damaged.

A portable air purifier according to an embodiment may include a housing provided with an inlet through which air may be suctioned, a filter, and a fan module and forming an air flow path in an vertical direction, a discharge disposed at an outlet of the housing and configured to guide a discharge direction of air, a rotational supporter which is connected to the housing, movement of which is restricted and which supports the discharge in a rotatable manner, and a rotational guide disposed respectively at the discharge and the rotational supporter and configured to guide rotation of the discharge to allow the discharge to rotate within predetermined angles.

The rotational supporter may include a core disposed on a lower side of the discharge and extended from a center of the outlet to the discharge, a core supporter which extends outside of the core, which is fixed to an inside of the housing and movement of which is restricted together with movement of the core, and a ball joint a lower side of which is coupled to the core and movement of which is restricted, and an upper side of which is inserted into the discharge and supports the discharge in a rotatable manner. An outside of the core may be a curved surface and have a transverse cross-section that is gradually reduced from a lower side connected to the core supporter toward the ball joint.

The core may have a circular cone shape and have a transverse cross-section that is gradually reduced further toward an upper side. The rotational guide may include a guide projection connected to the ball joint or integrated with the ball joint and protruding outside of the ball joint, and a guide groove forming a concave groove inside of the discharge facing the guide projection. The guide projection may be inserted into the guide groove, and rotation of the discharge at a predetermined angle or greater may be restricted as the guide projection is held inside of the guide groove.

The discharge may include a discharge body disposed at the outlet of the housing and configured to guide a discharge direction of air, a first supporter connected to the discharge body or integrated with the discharge body and provided with a first curved groove formed into a concave groove, and a second supporter coupled to the first supporter and provided therein with a second curved groove connected to the first surface groove. The ball joint may be disposed in an inner space formed by the first curved groove and the second curved groove, and may support the first supporter and the second supporter in a rotatable manner. The guide groove may be disposed at at least one of the first supporter or the second supporter facing the ball joint.

The portable air purifier may further include a position informing portion held in the discharge and providing a sense of manipulation when the discharge is at a predetermined position. The position informing portion may include an informing projection provided with a movable projection that is pressed against an outside of the ball joint by an elastic force. When the discharge is at a predetermined position, the movable projection may protrude outside of the ball joint, and an informing groove forming a groove into which the moving is inserted and held, inside the discharge facing the informing projection. The informing projection may include a first adjusting bolt fastened to a lower side of a mounting hole disposed at the ball joint, and an inner elastic member a lower side of which is supported by the first adjusting bolt, an upper side of which supports the movable projection, and which presses the movable projection using an elastic force.

A portable air purifier according to embodiments disclosed herein may include a housing having an inlet through which air is suctioned, a filter, and a fan module and forming an air flow path in an vertical direction, a discharge body disposed at an outlet of the housing and configured to guide a discharge direction of air, a first supporter connected to the discharge body or integrated with the discharge body and provided with a first curved groove in the form of a concave groove, a second supporter coupled to the first supporter and provided therein with a second curved groove connected to the first curved groove, and a rotational supporter, one or a first side of which connects to the housing, the other or a second side of which is disposed at a position facing the first curved groove and the second curved groove, and which supports the first supporter and the second supporter in a rotatable manner.

The rotational supporter may include a core disposed on a lower side of the second supporter and extended from a center to the outlet to the second supporter, a core supporter which extends outside of the core, which is fixed to an inside of the housing and movement of which is restricted together with movement of the core, and a ball joint, a lower side of which is coupled to the core and movement of which is restricted and an upper side of which is disposed inside the first curved groove and the second curved groove, and which supports the first supporter and the second supporter in a rotatable manner. The first supporter may include a first support body provided therein with the first curved groove in the form of a concave groove and fixed to a center of the discharge body, and a first wing that extends outside of the first support body and facing the second supporter. The first wing and the second supporter may be fixed by a fastening member.

The second supporter may include a second support body provided with a hole that communicates in the vertical direction and installed in a circumferential direction. The second support body facing the hole may be provided therein with the second curved groove.

The rotating supporter may include a sphere-shaped ball joint formed disposed inside of a sphere-shaped groove formed by the first curved groove and the second curved groove. An outer diameter of the ball joint may be greater than an inner diameter of a lower end of the second curved groove to prevent the ball joint from escaping out of the second supporter.

A frictional force between the first supporter and the ball joint and a frictional force between the second supporter and the ball joint may be inversely proportional to a distance between the first supporter and the second supporter that are arranged to face each other with the ball joint therebetween.

In a portable air purifier according to embodiments disclosed herein, a discharge may be installed on an upper side of a housing in a way that the discharge is supported by a rotational supporter in a rotatable manner to readily adjust a discharge direction of air, thereby ensuring improvement in user satisfaction. A rotational angle of the discharge may be limited to predetermined angles by a rotational guide, and an electric wire connected to the discharge may be prevented from being broken or damaged, thereby ensuring a reduction in costs incurred for maintenance and repairs. A movable projection protruding outside of a ball joint may be held in an informing groove formed at the discharge, and a user may readily ascertain the ball joint arrives at an initial position, thereby ensuring improvement in user convenience.

Embodiments are described above with reference to a number of illustrative embodiments thereof. However, embodiments are not intended to limit the embodiments and drawings set forth herein, and numerous other modifications and embodiments can be devised by one skilled in the art without departing from the technical spirit. Further, the effects and predictable effects based on the configurations in the disclosure are to be included within the range though not explicitly described in the description of the embodiments.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A portable air purifier, comprising:
   a housing having an inlet through which air is suctioned, a filter, and a fan module, and forming an air flow path in a vertical direction;
   a discharge disposed at an outlet of the housing and configured to guide a discharge direction of air;
   a rotational supporter which is connected to the housing, movement of which is restricted, and which supports the discharge in a rotatable manner; and
   a rotational guide disposed respectively at the discharge and the rotational supporter and configured to guide rotation of the discharge to allow the discharge to rotate within predetermined angles, wherein the rotational supporter comprises:
      a core disposed at a lower side of the discharge and extending from a center of the outlet to the discharge;
      a core supporter, which extends radially outward from the core, which is fixed to an inside of the housing, and movement of which is restricted together with movement of the core; and
      a ball joint, a lower side of which is coupled to the core and movement of which is restricted, and an upper side of which is inserted into the discharge and supports the discharge in a rotatable manner.

2. The portable air purifier of claim 1, wherein an outer surface of the core is a curved surface and a transverse cross-section of which is gradually reduced from a lower side connected to the core supporter toward the ball joint.

3. The portable air purifier of claim 1, wherein the core has a circular cone shape and a transverse cross-section which is gradually reduced toward an upper side.

4. The portable air purifier of claim 1, wherein the rotational guide comprises:
   a guide projection connected to the ball joint or integrated with the ball joint, and protruding from the ball joint; and
   a guide groove in the form of a concave groove provided inside of the discharge and facing the guide projection.

5. The portable air purifier of claim 4, wherein the guide projection is inserted into the guide groove, and rotation of the discharge at a predetermined angle or greater is restricted as the guide projection is held inside of the guide groove.

6. The portable air purifier of claim 4, wherein the discharge comprises:
   a discharge body disposed at the outlet of the housing and configured to guide the discharge direction of air;
   a first supporter connected to the discharge body or integrated with the discharge body, and provided with a first curved groove in the form of a concave groove; and
   a second supporter coupled to the first supporter and provided therein with a second curved groove connected to the first curved groove.

7. The portable air purifier of claim 6, wherein the ball joint is disposed at an inner space formed by the first curved groove and the second curved groove, and supports the first supporter and the second supporter in a rotatable manner.

8. The portable air purifier of claim 6, wherein the guide groove is disposed at at least one of the first supporter or the second supporter facing the ball joint.

9. The portable air purifier of claim 1, further comprising:
   a position informing portion held in the discharge and configured to provide a sense of manipulation when the discharge is at a predetermined position.

10. The portable air purifier of claim 9, wherein the position informing portion comprises:
    an informing projection provided with a movable projection that is pressed against an outside of the ball joint by an elastic force, wherein when the discharge is at a predetermined position, the movable projection protrudes outside of the ball joint; and an informing groove forming a groove into which the movable projection is inserted and held, inside the discharge facing the informing projection.

11. The portable air purifier of claim 10, wherein the informing projection comprises:

a first adjusting bolt fastened to a lower side of a mounting hole disposed at the ball joint; and an inner elastic member, a lower side of which is supported by the first adjusting bolt, an upper side of which supports the movable projection and which presses the movable projection using an elastic force.

12. A portable air purifier, comprising:

a housing having an inlet through which air is suctioned, a filter, and a fan module, and forming an air flow path in a vertical direction;

a discharge body disposed at an outlet of the housing and configured to guide a discharge direction of air;

a first supporter connected to the discharge body or integrated with the discharge body, and provided with a first curved groove in the form of a concave groove; and a second supporter coupled to the first supporter and provided therein with a second curved groove connected to the first curved groove; and a rotational supporter, a first side of which connects to the housing, a second side of which is disposed at a position facing the first curved groove and the second curved groove and which supports the first supporter and the second supporter in a rotatable manner.

13. The portable air purifier of claim 12, wherein the rotational supporter comprises:

a core disposed at a lower side of the second supporter and extending from a center to the outlet to the second supporter;

a core supporter, which extends radially outward from the core, which is fixed to an inside of the housing and movement of which is restricted together with movement of the core; and a ball joint, a lower side of which is coupled to the core and movement of which is restricted and an upper side of which is disposed inside of the first curved groove and the second curved groove, and which supports the first supporter and the second supporter in a rotatable manner.

14. The portable air purifier of claim 12, wherein the first supporter comprises:

a first support body provided therein with the first curved groove and fixed to a center of the discharge body; and a first wing that extends radially outward from the first support body and faces the second supporter.

15. The portable air purifier of claim 14, wherein the first wing and the second supporter are coupled by a fastening member.

16. The portable air purifier of claim 12, wherein the second supporter comprises:

a second support body provided with a hole that extends in the vertical direction and installed in a circumferential direction.

17. The portable air purifier of claim 16, wherein the second support body facing the hole is provided therein with the second curved groove.

18. The portable air purifier of claim 12, wherein the rotational supporter comprises a sphere-shaped ball joint disposed inside of a sphere-shaped groove formed by the first curved groove and the second curved groove, and wherein an outer diameter of the ball joint is greater than an inner diameter of a lower end of the second curved groove to prevent the ball joint from escaping from the second supporter.

19. The portable air purifier of claim 18, wherein a frictional force between the first supporter and the ball joint and a frictional force between the second supporter and the ball joint are inversely proportional to a distance between the first supporter and the second supporter which are arranged to face each other with the ball joint therebetween.

20. A portable air purifier, comprising:

a housing having an inlet through which air is suctioned, a filter, and a fan module, and forming an air flow path in a vertical direction;

a discharge disposed at an outlet of the housing and configured to guide a discharge direction of air;

a rotational supporter which is connected to the housing, movement of which is restricted, and which supports the discharge in a rotatable manner; and a rotational guide disposed respectively at the discharge and the rotational supporter and configured to guide rotation of the discharge to allow the discharge to rotate within predetermined angles, wherein the rotational supporter comprises a ball joint, a lower side of which is coupled to the housing and movement of which is restricted, and an upper side of which is inserted into the discharge to support the discharge in a rotatable manner.

21. The portable air purifier of claim 20, wherein the rotational guide comprises:

a guide projection connected to the ball joint or integrated with the ball joint, and protruding from the ball joint; and a guide groove in the form of a concave groove provided inside of the discharge and facing the guide projection.

* * * * *